US010864832B2

(12) United States Patent
Stover et al.

(10) Patent No.: US 10,864,832 B2
(45) Date of Patent: Dec. 15, 2020

(54) GROUNDS MAINTENANCE VEHICLE WITH ADJUSTABLE SUSPENSION SYSTEM

(71) Applicant: THE TORO COMPANY, Bloomington, MN (US)

(72) Inventors: Dale A. Stover, Plymouth, MN (US); Alexander E. Hoy, Lake Elmo, MN (US); Derek S. Duchscherer, Eden Prairie, MN (US); Patrick J. Shaver, Woodbury, MN (US)

(73) Assignee: THE TORO COMPANY, Bloomington, MN (US)

( * ) Notice: Subject to any disclaimer, the term of this patent is extended or adjusted under 35 U.S.C. 154(b) by 54 days.

(21) Appl. No.: 16/157,506

(22) Filed: Oct. 11, 2018

(65) Prior Publication Data

US 2019/0111812 A1   Apr. 18, 2019

Related U.S. Application Data

(60) Provisional application No. 62/572,814, filed on Oct. 16, 2017.

(51) Int. Cl.
| | | |
|---|---|---|
| *B60N 2/50* | (2006.01) | |
| *B60N 2/54* | (2006.01) | |
| *A01D 34/64* | (2006.01) | |
| *A01D 34/82* | (2006.01) | |
| *B62D 27/04* | (2006.01) | |
| *B62D 24/04* | (2006.01) | |

(Continued)

(52) U.S. Cl.
CPC .............. *B60N 2/505* (2013.01); *A01D 34/64* (2013.01); *A01D 34/82* (2013.01); *A01D 67/04* (2013.01); *B60N 2/548* (2013.01); *B62D 21/03* (2013.01); *B62D 24/04* (2013.01); *B62D 27/04* (2013.01); *A01D 2101/00* (2013.01)

(58) Field of Classification Search
CPC .......... B60N 2/505; B60N 2/548; B60N 2/24; B60N 2/502; B62D 24/04; B62D 21/03; B62D 27/04; A01D 67/04; A01D 34/64; A01D 34/82; A01D 2101/00
USPC ...................................................... 296/65.02
See application file for complete search history.

(56) References Cited

U.S. PATENT DOCUMENTS

| | | |
|---|---|---|
| 2,531,572 A | 11/1950 | Knoedler |
| 2,573,077 A | 10/1951 | White et al. |

(Continued)

FOREIGN PATENT DOCUMENTS

| | | |
|---|---|---|
| EP | 0 081 313 A1 | 6/1983 |
| GB | 774129 A | 5/1957 |

OTHER PUBLICATIONS

"Skiroule Snowmobile—RT & RTX Series II" Owner's Manual and Maintenance Guide. Form 3213-9001, Skiroule Coleman. Printed in Canada circa 1973; 38 pages.

*Primary Examiner* — Pinel E Romain
(74) *Attorney, Agent, or Firm* — Mueting Raasch Group

(57) ABSTRACT

Suspension systems and grounds maintenance vehicles incorporating the same are disclosed. The suspension system may include biasing elements or springs that may be adjusted to vary the preload and thus change the spring and dampening characteristics of the suspension system. In some embodiments, the system may include an adjustment mechanism that permits simultaneous adjustment of two springs via a single action. In other embodiments, features adapted to assist an operator with mounting/dismounting the vehicle are disclosed.

25 Claims, 26 Drawing Sheets

(51) Int. Cl.
    *B62D 21/03*     (2006.01)
    *A01D 67/04*     (2006.01)
    *A01D 101/00*     (2006.01)

(56) References Cited

U.S. PATENT DOCUMENTS

| | | | |
|---|---|---|---|
| 2,707,986 A | 5/1955 | Johnson | |
| 2,800,948 A | 7/1957 | Omon et al. | |
| 2,829,703 A | 4/1958 | Knoedler | |
| 2,868,273 A | 1/1959 | Barrett | |
| 2,991,970 A | 7/1961 | White et al. | |
| 3,006,593 A | 10/1961 | Plate et al. | |
| 3,357,717 A | 12/1967 | Samford | |
| 3,420,568 A | 1/1969 | Henriksson et al. | |
| 3,756,552 A | 9/1973 | Wilhelms et al. | |
| 3,774,711 A * | 11/1973 | Lacey | B60N 2/502 180/329 |
| 3,788,412 A | 1/1974 | Vincent | |
| 3,994,469 A | 11/1976 | Swenson et al. | |
| 4,072,287 A * | 2/1978 | Swenson | B60N 2/502 248/421 |
| 4,103,858 A | 8/1978 | Swenson | |
| 4,291,857 A | 9/1981 | Totten et al. | |
| 4,351,556 A | 9/1982 | Worringer | |
| 4,392,546 A | 7/1983 | Brown et al. | |
| 4,662,597 A | 5/1987 | Uecker et al. | |
| 4,944,554 A | 7/1990 | Gross et al. | |
| 5,367,864 A | 11/1994 | Ogasawara et al. | |
| 5,794,911 A * | 8/1998 | Hill | B60N 2/502 248/419 |
| 5,799,475 A | 9/1998 | Borling et al. | |
| 6,698,172 B2 | 3/2004 | Ferris et al. | |
| 6,711,885 B2 | 3/2004 | Ferris | |
| 6,857,254 B2 * | 2/2005 | Melone | A01D 34/64 56/15.8 |
| 7,044,553 B2 | 5/2006 | Ropp | |
| 7,107,746 B2 * | 9/2006 | Melone | A01D 34/64 56/15.8 |
| 7,882,914 B2 * | 2/2011 | Scheele | A01D 34/82 180/89.14 |
| 7,930,813 B2 | 4/2011 | Melone et al. | |
| 7,942,224 B2 | 5/2011 | Marshall et al. | |
| 8,065,864 B2 | 11/2011 | Melone et al. | |
| 8,146,899 B2 | 4/2012 | Hiser | |
| 8,186,475 B2 | 5/2012 | Sugden et al. | |
| 8,245,806 B2 | 8/2012 | Newell | |
| 8,397,367 B2 * | 3/2013 | Melone | A01D 34/64 29/428 |
| 8,561,748 B1 | 10/2013 | Hahn et al. | |
| 8,794,660 B1 | 8/2014 | Stover et al. | |
| 8,944,449 B2 * | 2/2015 | Hurd | B60K 5/00 280/124.152 |
| 9,003,751 B2 | 4/2015 | Lancaster | |
| 9,499,204 B1 | 11/2016 | Gust et al. | |
| 9,821,689 B2 | 11/2017 | Busboom et al. | |
| 10,029,738 B2 * | 7/2018 | Andre | B62D 27/04 |
| 10,597,092 B2 | 3/2020 | Stover et al. | |
| 2005/0082897 A1 | 4/2005 | Ropp et al. | |
| 2006/0131799 A1 | 6/2006 | Carlitz et al. | |
| 2012/0049039 A1 * | 3/2012 | Scheffler | A01D 34/82 248/636 |
| 2016/0031492 A1 * | 2/2016 | Suzuki | B62D 21/183 280/788 |
| 2017/0056261 A1 | 3/2017 | Vereen, III et al. | |
| 2018/0251053 A1 | 9/2018 | Kemp et al. | |

\* cited by examiner

GROUNDS MAINTENANCE VEHICLE WITH ADJUSTABLE SUSPENSION SYSTEM

This application claims the benefit of U.S. Provisional Pat. App. No. 62/572,814, filed Oct. 16, 2017, the content of which is incorporated herein by reference in its entirety.

Embodiments of the present disclosure are directed generally to riding grounds maintenance vehicles (e.g., turf care vehicles such as lawn mowers) having an adjustable suspension system, and, in other embodiments, vehicle access features to assist with mounting and dismounting the vehicle.

BACKGROUND

Operators of grounds maintenance vehicles, such as zero-turn-radius (ZTR) mowers, often operate the vehicle for extended periods of time. Accordingly, mowers incorporating some type of suspension system have become more common in recent years. However, there may be significant variability in what operators consider desirable with regard to specific suspension system characteristics (e.g., stiffness/spring rate and dampening). Further, even the same operator may wish to adjust these characteristics over time (or even over the course of a single work day).

While configurations vary, some known suspension systems are complex and ill-suited to providing the variability in spring rate and/or dampening characteristics needed to satisfy a wide range of operators and terrain types. Moreover, some of these suspension systems are complicated, which may not only increase the cost of manufacture, but may require correspondingly complicated repairs and/or maintenance.

In addition to ride comfort, convenient access to the mower's operator platform (e.g., seat) is also desirable. Typically, to reach the operator seat, the operator first steps onto the mower's floor pan or foot area, which is generally located immediately forward of the seat. The foot area is usually accessed via the side or the front of the mower.

When the mower has one or more large cutting decks (or other side or front attachments), mounting the mower may present challenges for some operators (e.g., those of shorter stature and/or those having certain physical limitations). For example, for mowers having relatively wide cutting decks, the operator may be required (when mounting from the side) to extend his or her leg across a relatively large distance in order to step over the cutting deck (if the deck is not suited to bearing the operator's weight).

In other mowers, various components (e.g., out-front cutting decks) may be located at or near the front end of the mower or, as is common with ZTR mowers, the front of the mower may include a continuous, transverse, and upwardly angled foot rest. Such a configuration may also present challenges for some operators when mounting/dismounting the mower from the front. Due to their unique configuration, ZTR mowers may also lack grab handles or similar structure that may be used by the operator during mounting/dismounting of the mower.

SUMMARY

Embodiments described herein may provide a grounds maintenance vehicle including: a chassis having a front end, a rear end, and a longitudinal axis extending between the front and rear ends; a support platform extending along the longitudinal axis, wherein the support platform includes a seat support portion; and a suspension system. The suspension system includes a first suspension apparatus operatively acting between the chassis and the seat support portion of the support platform. The first suspension apparatus has first and second torsion springs, wherein the torsion springs are adapted to elastically deflect when the support platform is displaced relative to the chassis. The suspension system further includes: a second suspension apparatus longitudinally spaced-apart from the torsion springs, wherein the second suspension apparatus is operatively connected to both the support platform and the chassis; and an adjuster adapted to simultaneously adjust a preload applied to both of the first and second torsion springs.

In another embodiment, a grounds maintenance vehicle is provided that includes: a chassis having a front end, a rear end, and a longitudinal axis extending between the front and rear ends. The vehicle also includes a support platform extending along the longitudinal axis, wherein the support platform has a seat support portion, a foot support portion, and a connecting structure connecting the seat support portion to the foot support portion. Moreover, the vehicle includes a suspension system having a first suspension apparatus adapted to bias the support platform away from the chassis. The first suspension apparatus includes first and second torsion springs spaced-apart from one another in a direction transverse to the longitudinal axis, wherein the torsion springs are adapted to elastically deflect when the support platform is displaced toward the chassis. The suspension system also includes: a second suspension apparatus longitudinally spaced-apart from the first suspension apparatus, wherein the second suspension apparatus is also adapted to bias the support platform away from the chassis; and an adjuster adapted to simultaneously alter a preload applied to both of the first and second torsion springs.

In yet another embodiment, a riding lawn mower is provided that includes: a chassis having a front end, a rear end, and a longitudinal axis extending between the front and rear ends; and a support platform extending along the longitudinal axis. The support platform includes: a seat support portion supporting an operator seat; a foot support portion; and a connecting structure connecting the seat support portion to the foot support portion. The mower also includes a pivot member defining a transverse first pivot axis and a transverse second pivot axis, wherein the pivot member is: pivotally coupled to the chassis at the first pivot axis; and pivotally coupled to the support platform at the second pivot axis. A suspension system is also provided and includes first and second torsion springs positioned about the second pivot axis. The torsion springs operatively bias the support platform upwardly and away from the chassis and elastically deflect when the support platform is displaced toward the chassis. The torsion springs are located longitudinally near the seat support portion. The suspension system also includes: a coil-over shock absorber positioned longitudinally forward from the first and second torsion springs, wherein the shock absorber is operatively connected to the platform and to the chassis; and an adjuster adapted to simultaneously alter a preload applied to both of the first and second torsion springs.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
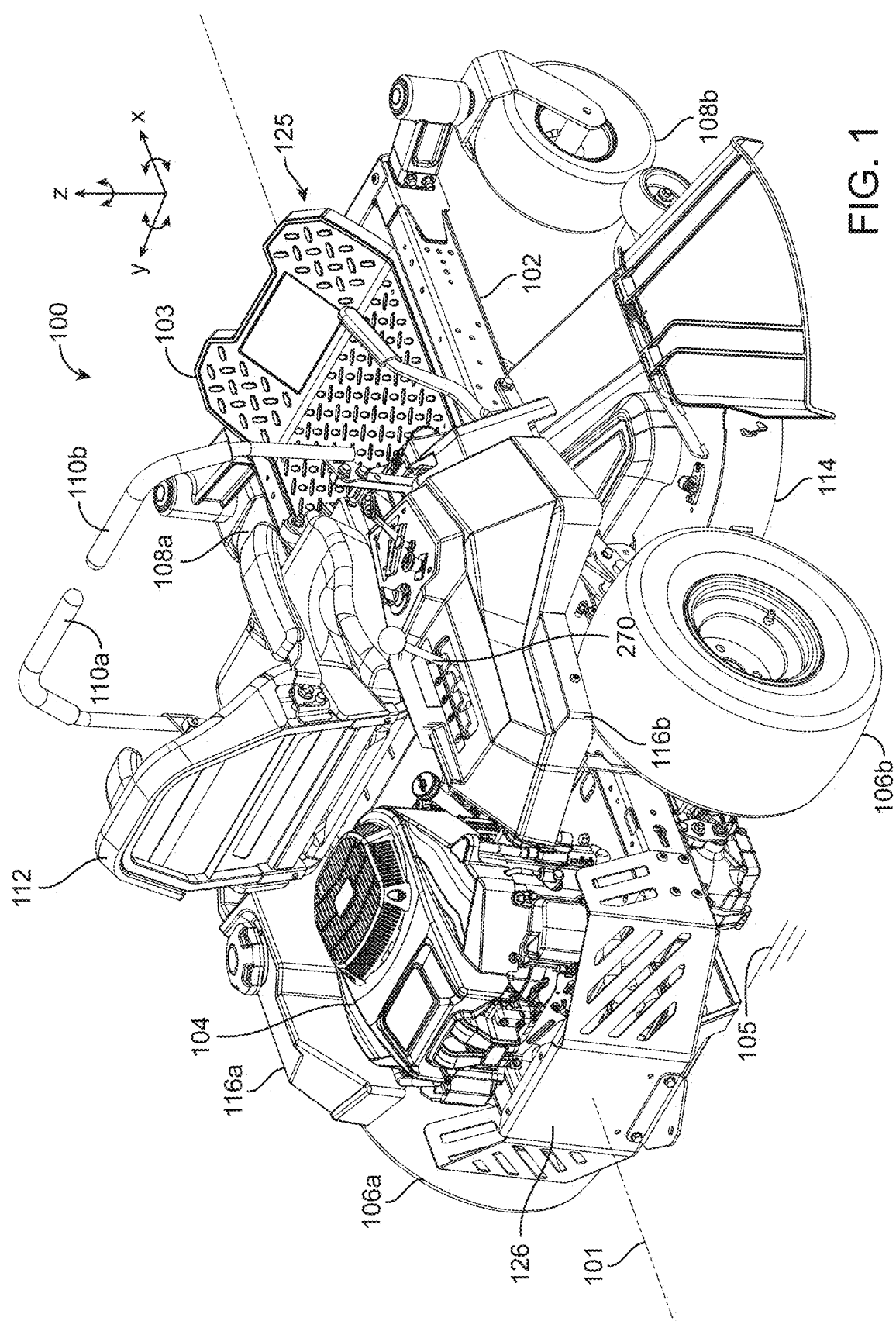
FIG. 1 illustrates a grounds maintenance vehicle, e.g., riding lawn mower, incorporating an adjustable suspension system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. "I.e." is used as an abbreviation for the Latin phrase id est, and means "that is." "E.g." is used as an abbreviation for the Latin phrase exempli gratia, and means "for example."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle (e.g., mower 100 of FIG. 1) while it is in an operating configuration, e.g., while the mower 100 is positioned such that wheels 106 and 108 rest upon a generally horizontal ground surface 105. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While various embodiments are possible within the scope of this disclosure, some embodiments are directed to grounds maintenance vehicles that include a chassis supported by one or more ground contact members. The vehicle also includes an operator support platform adapted to support a riding operator, and a suspension system operatively acting between the chassis and the support platform. The suspension system may attenuate forces, e.g., travel-induced forces, which may otherwise be transmitted to the support platform during vehicle operation. Stated another way, the support platform, and thus the operator, may be partially isolated from forces imparted to the chassis as a result of vehicle operation. Moreover, in some embodiments, the suspension system may permit adjustment of spring rate and/or dampening of the suspension system to, for example, better accommodate a range of operator riding preferences. Some embodiments may provide a single adjuster that alters the spring rate and/or dampening characteristics of multiple suspensions units simultaneously. Such a configuration may be beneficial when, for example, symmetric adjustment of multiple suspension units is desired.

Still further, illustrative suspension systems may provide a low profile, permitting components of the suspension system (e.g., the suspension units) to be contained within an envelope generally defined by the remainder of the vehicle.

In other embodiments, operator assistance features may be provided to assist with mounting and dismounting the vehicle. For instance, vehicles may include assist handles that may be deployed during mounting and dismounting of the vehicle, and then stowed during operation. Yet other embodiments may provide a step-through chassis that provides low-step height access when mounting and dismounting the vehicle.

FIG. 1 illustrates an exemplary grounds maintenance vehicle 100 that incorporates a suspension system 200 (see FIG. 2) in accordance with embodiments of the present disclosure. As stated above, the suspension system 200 may operatively connect a chassis 102 of the vehicle with an operator support platform 103. As a result, the support platform 103 may "float" relative to the chassis 102 via compliance of the suspension system 200. That is, the suspension system 200 may allow for relative motion between the support platform 103 and the chassis 102.

While the vehicle is shown and described herein as a self-propelled ride-on lawn mower (also referred to herein simply as a "mower" or "vehicle"), such a configuration is not limiting. That is, those of skill in the art will realize that embodiments of the present disclosure may find application to other types of ride-on (e.g., sit-on or stand-on) grounds maintenance vehicles including skid-steer vehicles, aerators, material spreader/sprayers, dethatchers, snow throwers, and debris management systems, to name a few.

As shown in FIG. 1, the mower 100/chassis 102 may define front and rear ends 125, 126, respectively, with a longitudinal or travel axis 101 extending between the front and rear ends (i.e., the longitudinal axis being the axis of mower travel when the mower is traveling in a straight line). As used herein, a transverse axis or plane is any laterally extending axis or plane that is normal to the longitudinal axis 101.

The chassis 102 may support a prime mover (e.g., internal combustion engine 104), which may, in one embodiment, be located at or near the rear end 126 of the mower 100. Left and right ground-engaging drive members (e.g., rear drive wheels 106a, 106b) may be coupled to left and right sides, respectively, of the chassis 102. Each drive wheel may be powered to rotate, relative to the chassis 102, about an axis such that simultaneous and equal rotation of the two drive wheels causes the mower 100 to move parallel to (i.e., along) the longitudinal axis 101. In some embodiments, the mower 100 may be configured as a ZTR vehicle, wherein the drive wheels 106 are independently driven by the engine 104 (e.g., via one or more hydraulic motors/pumps, hydrostatic transmissions, or the equivalent). While described herein as an internal combustion engine 104, other embodiments could utilize other prime movers, e.g., an electrical motor, to power the drive wheels 106, or utilize separate prime movers for propulsion and for implement (cutting deck) power. Moreover, while illustrated as wheels 106, other embodiments may utilize other drive members (e.g., tracks or the like) without departing from the scope of this disclosure.

The mower 100 may additionally include one or more, e.g., two, support members or wheels 108a, 108b. In the illustrated embodiment, the support wheels 108 are caster wheels and are located forward of the drive wheels 106 (e.g., during normal forward travel of the mower) and are thus referred to herein simply as "front" wheels. Together, the wheels 106 and 108 support the mower 100 in rolling engagement with the ground surface 105. While described herein as utilizing two rear drive wheels and two front castering wheels, such a configuration is merely exemplary. For example, other embodiments may use more or less wheels (e.g., a tri-wheel configuration), while still other embodiments may provide different drive wheel configurations (e.g., front-wheel drive or all-wheel drive) or different steering configurations (e.g., a vehicle with conventional Ackermann-type steering).

The mower 100 may further include one or more controls, e.g., left and right drive control levers 110a, 110b. The drive control levers 110 may be pivotally coupled to the mower 100 (e.g., to the chassis 102) such that the levers may independently pivot forwardly and rearwardly (e.g., about a transverse axis) under the control of an operator located at an operator station that, in one embodiment, is configured as an operator seat 112. Via incremental pivoting, the drive control levers 110 are operable to control the speed and direction of their respective drive wheels 106 (e.g., the left lever 110a may control speed and rotational direction of the left drive wheel 106a, while the right lever 110b may control speed and rotational direction of the right drive wheel 106b) via manipulation of the mower's drive system. While illustrated herein as incorporating separate drive control levers 110, other controls, e.g., single or multiple joysticks or joystick-type levers, touchpads, steering wheels, foot pedals, etc. could also be used to control one or both of mower speed and direction.

An implement, e.g., lawn mower cutting deck 114, may be mounted to the lower side of the chassis 102, e.g., generally between the rear drive wheels 106 and the front wheels 108. The cutting deck 114 may include a housing forming a cutting chamber partially surrounding one or more rotatable cutting blades (not shown) as is known in the art. While shown as a mid- or belly-mount deck, other embodiments may position the deck in other locations, e.g., forward of the front wheels 108, aft of the rear wheels 106, lateral to the chassis 102, etc.

During operation, power is selectively delivered (by the prime mover 104) to the cutting deck 114 and the drive wheels 106, whereby the cutting blades rotate at a speed sufficient to sever grass and other vegetation as the deck passes over the ground surface 105. Typically, the cutting deck 114 has an operator-selectable height-of-cut system to allow deck height adjustment relative to the ground surface 105.

The mower 100 may also include one or more side shells or fenders 116 located relatively close to the operator seat. The fenders 116 provide not only storage areas for the operator, but also cover a variety of vehicle controls and components, such as the fuel tank. The mower 100 may include a fender on both the left (fender 116a) and right (fender 116b) side of the operator seat 112 as shown in FIG. 1.

In some embodiments, the fenders are constructed of plastic (but could be made of metallic and other non-metallic materials). Each fender may include several cutouts for storage of items. For example, a cup holder may be provided on one or both of the fenders. As stated above, each fender may also accommodate a variety of machine controls, such as the drive control levers, engine throttle, ignition, PTO engagement, etc.

Figure 2:
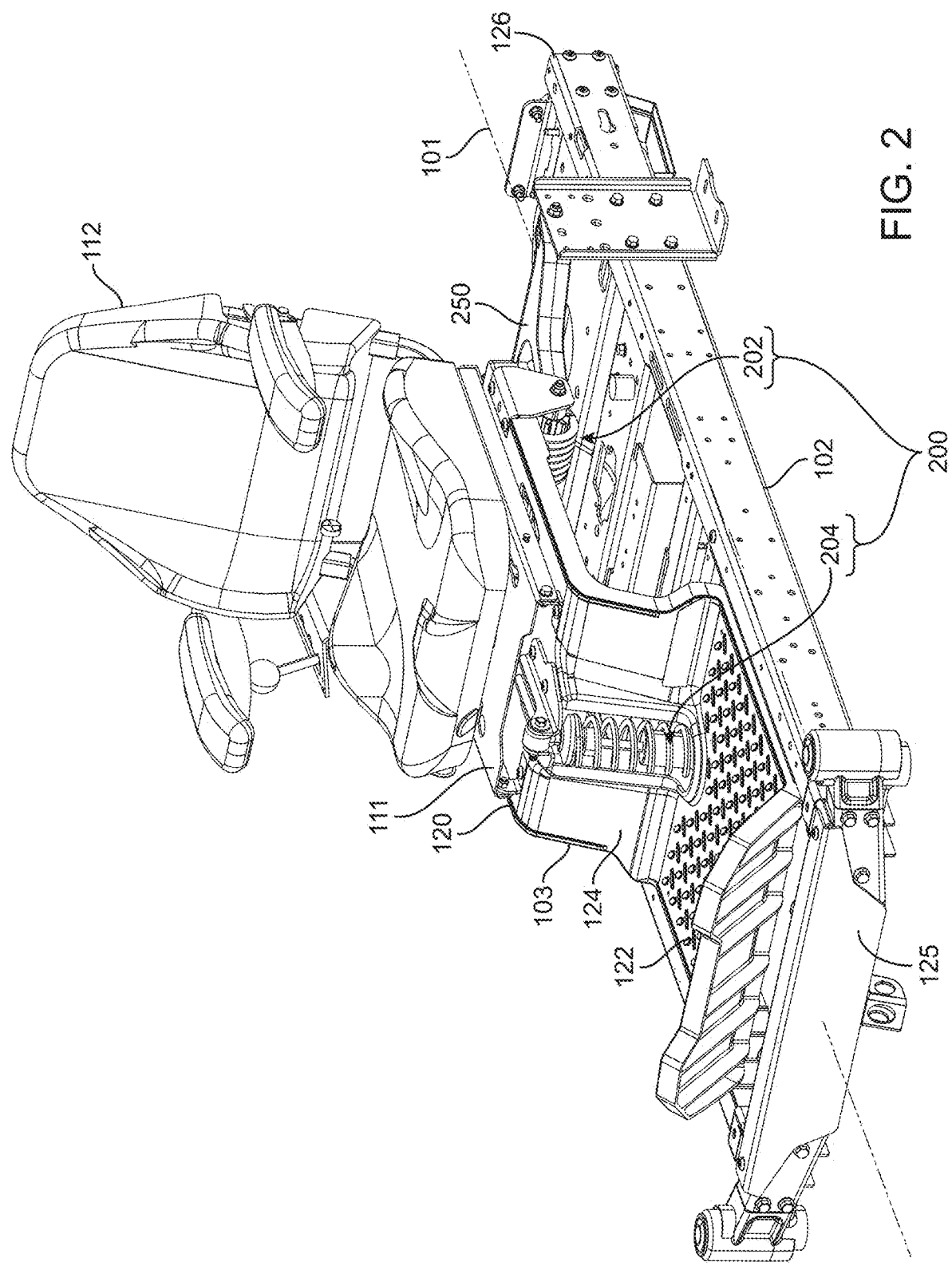
FIG. 2 is a partial perspective view of the mower of FIG. 1 illustrating portions of the exemplary suspension system.

As illustrated in the partial view of FIG. 2, a suspension system, e.g., suspension system 200, may be operatively connected between the chassis 102 and the support platform 103. In one embodiment, the suspension system 200 includes, among other components, a first suspension apparatus 202 and, optionally, a second suspension apparatus 204.

The first suspension apparatus 202 may be longitudinally positioned (i.e., positioned along the longitudinal axis 101) at or near a rear end of the support platform 103 (e.g., at or near the seat support portion), while the second suspension apparatus 204 may be longitudinally spaced-apart from the apparatus 202 such that it is located more toward an intermediate or central portion of the support platform 103. While such placement may position the suspension apparatus 202, 204 near a center of the unsprung mass of the support platform 103, other suspension apparatus locations are also contemplated.

While the exact placement may vary, the seat 112 is generally located mid-ship on the chassis (forward of the engine 104). One or more isolators (not shown) may be provided between the seat 112 and a seat frame 111, the latter attached to the support platform 103. The isolator(s) may include elastomeric elements that absorb multidirectional forces resulting from engine and/or mower operation. Once again, while shown as a seat 112, operator stations adapted to support a standing operator are also contemplated within the scope of this disclosure.

One turf vehicle suspension system that provides adjustable spring and dampening characteristics is described in U.S. Pat. No. 9,499,204 (the "'204 Patent"). Embodiments described in the '204 Patent utilize an operator platform that is supported, relative to a chassis of the vehicle, by a first and second suspension apparatus. In some embodiments, the first suspension apparatus includes first and second shock absorbers laterally offset from one another, wherein the first and second shock absorbers are pivotable in a vertical plane. Pivoting of the shock absorbers alters the characteristics of the suspension system as explained in the '204 Patent.

While the suspension system 200 of the present disclosure has elements in common with systems described in the '204 Patent (e.g., a chassis, platform, and suspension system with a centered, forward suspension apparatus), the system 200 does not utilize multiple, pivoting rear shock absorbers. Instead, the first suspension apparatus 202 is, in some embodiments, formed by one or more compact-height suspension units located primarily beneath the seat elevation. For instance, as shown in the partial perspective views of FIGS. 3 and 4, the suspension apparatus 202 may include first and second biasing elements (e.g., torsion springs 206) as described in more detail below. In some embodiments, the two torsion springs are spaced-apart from one another in a transverse direction.

Similar to the vehicles described in the '204 Patent, the support platform 103 has a long dimension that extends along the longitudinal axis 101. In addition to a seat support portion 120 to which the seat 112 may couple, the support platform 103 may further define a foot support portion 122, and a connecting structure 124, the latter which may connect the seat support portion to the foot support portion. As shown in FIG. 2, the seat support portion 120 may form the rear end of the platform 103, while the foot support portion 122 may form the front end.

The connecting structure 124 may be a separate component of the platform 103 or, alternatively, part of one or both of the seat support portion 120 and the foot support portion 122. In general, the connecting structure 124 may be of most any configuration that connects the seat support portion 120 to the foot support portion 122 of the support platform 103. For instance, in the illustrated embodiment, the foot support portion 122 is vertically spaced-apart from (e.g., below) the seat support portion 120 and, in at least one embodiment, the foot support portion 122 and the seat support portion 120 are in generally parallel planes. As a result, the connecting structure 124 may be oriented in a direction that is generally vertical, or at an incline from vertical. Regardless of its exact orientation, the connecting structure 124 may extend from a forward end of the seat support portion 120 downwardly to a rear end of the foot support portion 122. As described and illustrated herein, the connecting structure 124, the seat support portion 120, and/or the foot support portion 124 may incorporate features (e.g., cutouts or openings) to accommodate the second suspension apparatus 204 (see FIG. 2). While the support platform 103 is shown herein as a unitary (e.g., cast or welded) structure, those of skill in the art will realize that it could also be an assembly of multiple components that are rigidly connected (e.g., bolted, welded, clamped, pinned, etc.), or otherwise attached to one another.

Although shown as being vertically spaced-apart, the seat support portion 120 and the foot support portion 122 may, in other embodiments, both be on the same plane (i.e., forming a generally flat support platform 103). In such a configuration, the connecting structure 124 is understood to be an intermediate portion of the support platform 103 that lies between the seat support portion 120 and the foot support portion 122.

In the illustrated embodiments, the suspension system 200 includes the first suspension apparatus 202 and the second suspension apparatus 204, each of which operatively supports the platform 103 relative to the chassis 102 (e.g., biases the support platform away from the chassis) as the platform moves through its range of motion. For purposes of this description, potential degrees of freedom of the platform 103/seat 112, relative to the chassis 102, may be described as occurring in relation to three mutually perpendicular axes as shown in FIG. 1: the longitudinal or fore-and-aft axis x; the transverse or side-to-side axis y; and the vertical axis z. In addition to potential translation along each of these three axes, the platform 103/seat 112 may also potentially pivot, relative to the chassis 102, about the x (e.g., "roll"), y (e.g., "pitch"), and z (e.g., "yaw") axes.

Figure 3:
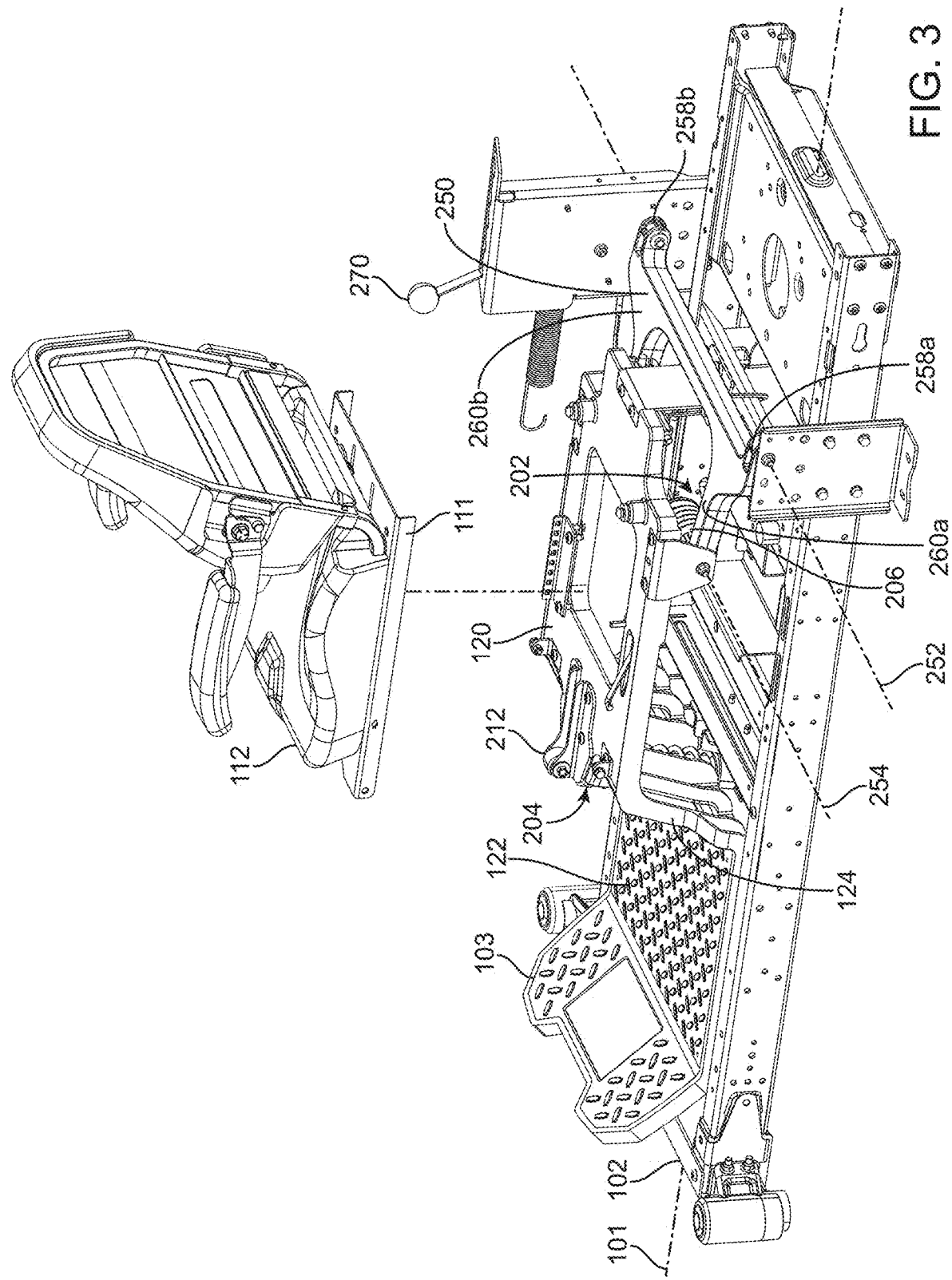
FIG. 3 is another partial perspective view of the mower of FIG. 1 with components (e.g., the seat and seat frame) shown exploded from a platform of the mower.
Figure 4:
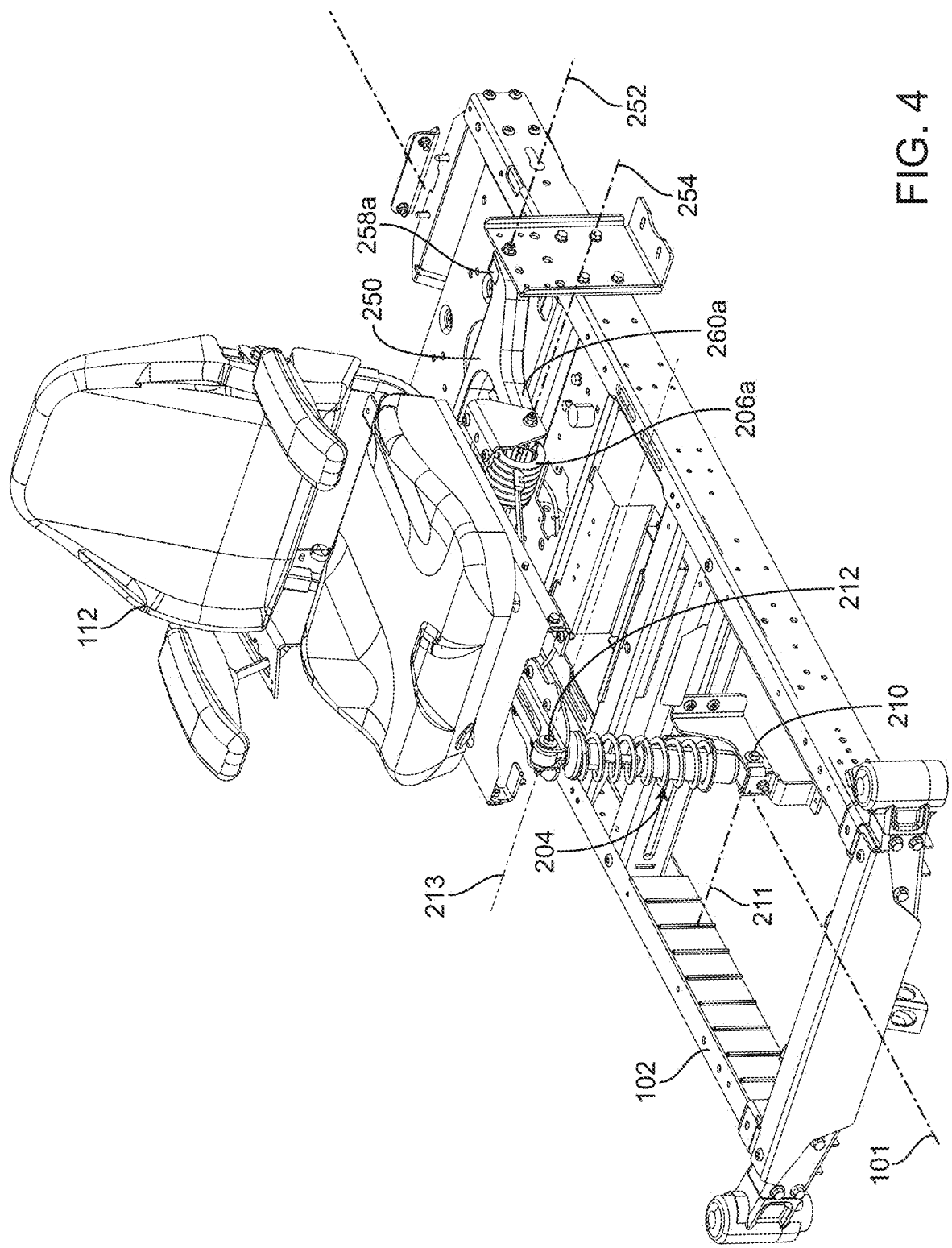
FIG. 4 is a view similar to FIG. 2, but with a support platform removed to better illustrate aspects of the exemplary suspension system.

With reference to FIGS. 3 and 4, the second suspension apparatus may be configured as a coil-over shock absorber 204 that defines a front connection of the platform 103 to the chassis 102. As shown in these views, the shock absorber 204 may be pivotally connected to the chassis 102 at a frame pivot 210 and to the platform 103 (only partially shown in FIG. 4) at a platform pivot 212. The pivots 210, 212 may define transverse, parallel axes 211, 213, respectively, about which the shock absorber 204 may pivot. Moreover, the shock absorber 204 may utilize spherical rod ends at each of the pivots 210, 212 to allow limited side-to-side translation of the platform 103 relative to the chassis 102. While shown herein as a linear shock absorber, the second suspension apparatus could be configured as most any suspension device including, for example, one or more elastomeric elements, torsion springs, extension springs, compression springs, gas-filled devices, etc. In fact, any device that is capable of providing elastic deflection could be used.

The suspension system 200 may further include a pivot member 250 that defines a rear connection of the platform 103 to the chassis 102. The pivot member 250 may assist in reducing or even eliminating fore-and-aft and transverse (side-to-side) translation, as well as rolling and yawing, of the support platform 103 relative to the chassis 102. In other words, the pivot member 250 may be configured to permit the support platform 103 to move generally up and down and pitch, while reducing or eliminating transverse and fore-and-aft translation, as well as rolling and yawing.

The pivot member 250 may define two transverse pivot axes: a first pivot axis 252 and a second pivot axis 254. The pivot member 250 may be pivotally coupled to the chassis 102 at the first pivot axis 252, and pivotally coupled to the support platform 103 at the second pivot axis 254. In the illustrated embodiment, the first and second pivot axes 252, 254 are parallel to one another and transverse to the longitudinal axis 101. The second pivot axis 254 may pivotally couple to the support platform 103 along the seat support portion 120 as shown (e.g., under the center of mass of the operator). Moreover, while illustrated with the first pivot axis 252 being located aft of the second pivot axis 254, other embodiments may place the first pivot axis forward of the second pivot axis.

As shown in FIG. 3, the pivot member may include transverse lugs 258 (258a, 258b) that define the first pivot axis 252. Extending outwardly (forwardly) from the lugs 258 is at least one arm 260. In the illustrated embodiments, the pivot member 250 includes two such arms 260a, 260b one extending from each of the lugs 258. Forward or opposite ends of the arms 260 define coaxial features (e.g., openings, pins, etc.) that permit pivotal connection to the platform 103 at the second pivot axis 254.

Figure 5:
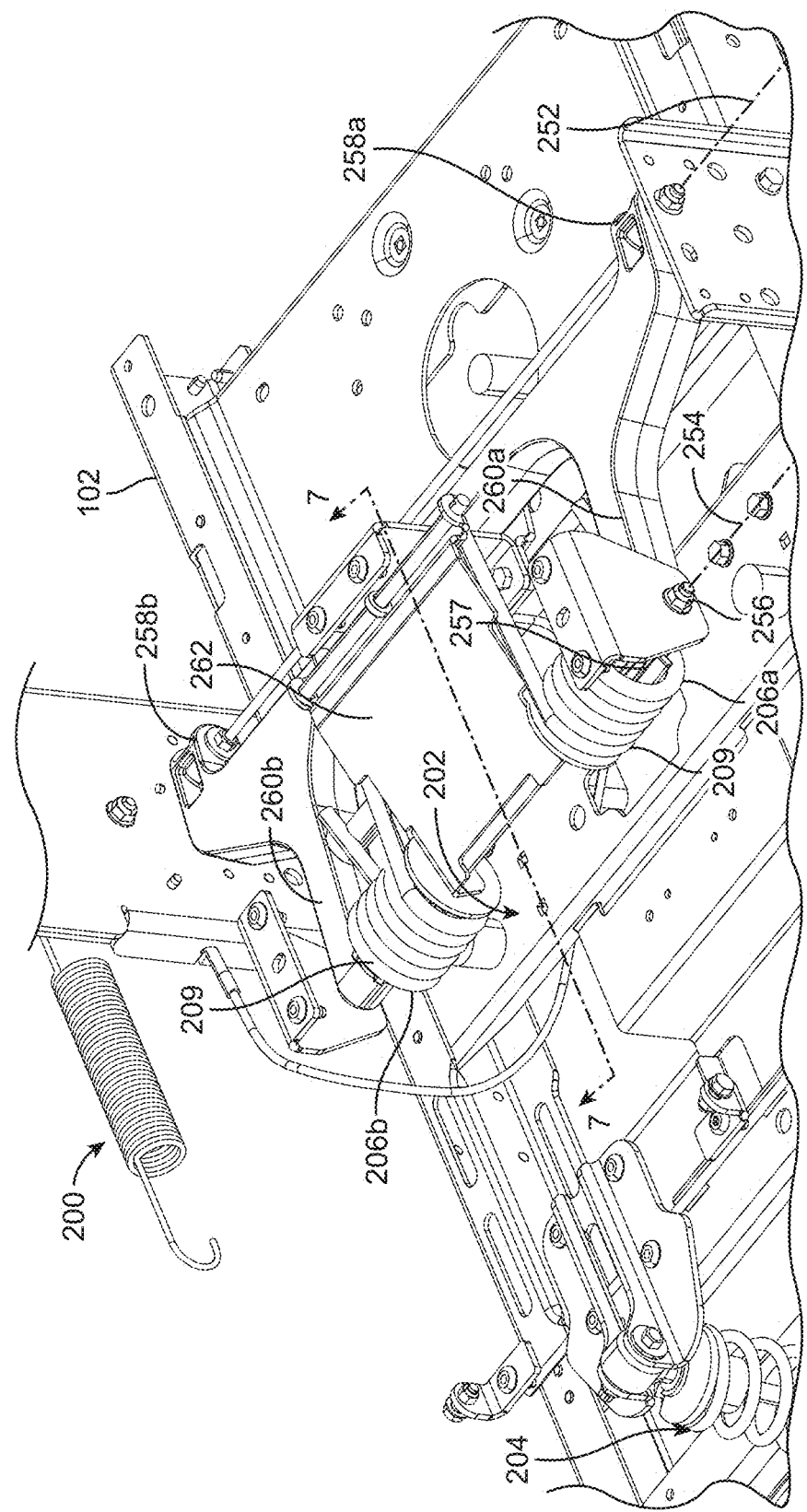
FIG. 5 is an enlarged partial perspective view of a portion (e.g., first suspension apparatus) of the suspension system of FIGS. 1-4.
Figure 6:
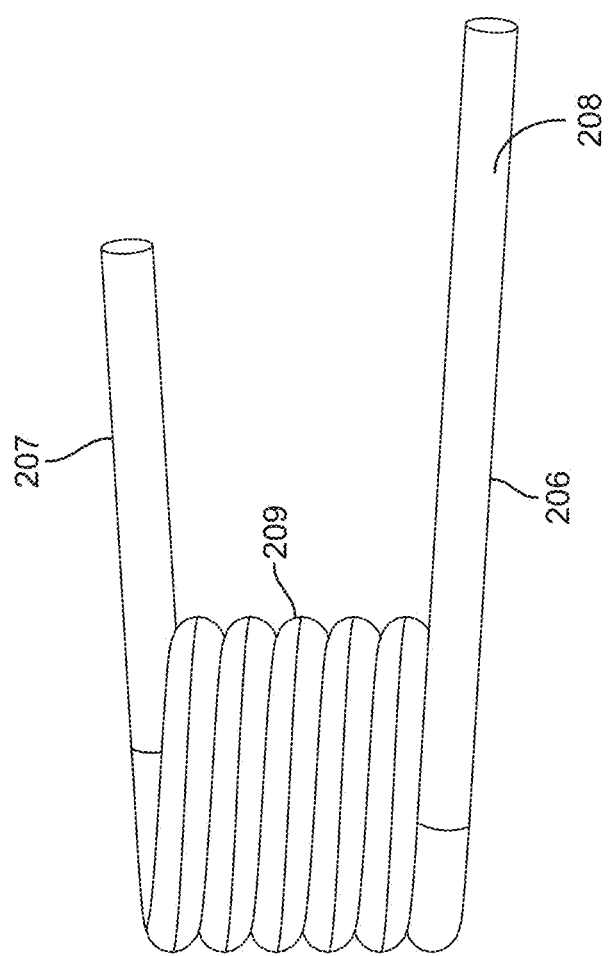
FIG. 6 is a torsion spring that forms an exemplary biasing element of the first suspension apparatus.

FIG. 5 illustrates a portion of the suspension system 200 with various vehicle structure removed to better illustrate the biasing elements of the first suspension apparatus 202, e.g., the torsion springs 206, one of which is illustrated in isolation in FIG. 6. Each torsion spring includes a coiled body 209 and protruding legs 207 and 208. The legs 207, 208 may be generally equal in length, or may be different as shown in FIG. 6, e.g., leg 208 may be longer that leg 207. The torsion springs are adapted to elastically deflect when the support platform 103 is displaced relative to the chassis 102.

The torsion springs 206 are positioned about a shaft 256 (via a supporting mandrel 257) extending along the second pivot axis 254 such that the coiled body 209 of each torsion spring moves with the second pivot axis 254 during operation. A guide plate 262 is also pivotally attached to the shaft 256 such that it may move with the second pivot axis 254, as well as pivot about the second pivot axis 254.

Figure 7:
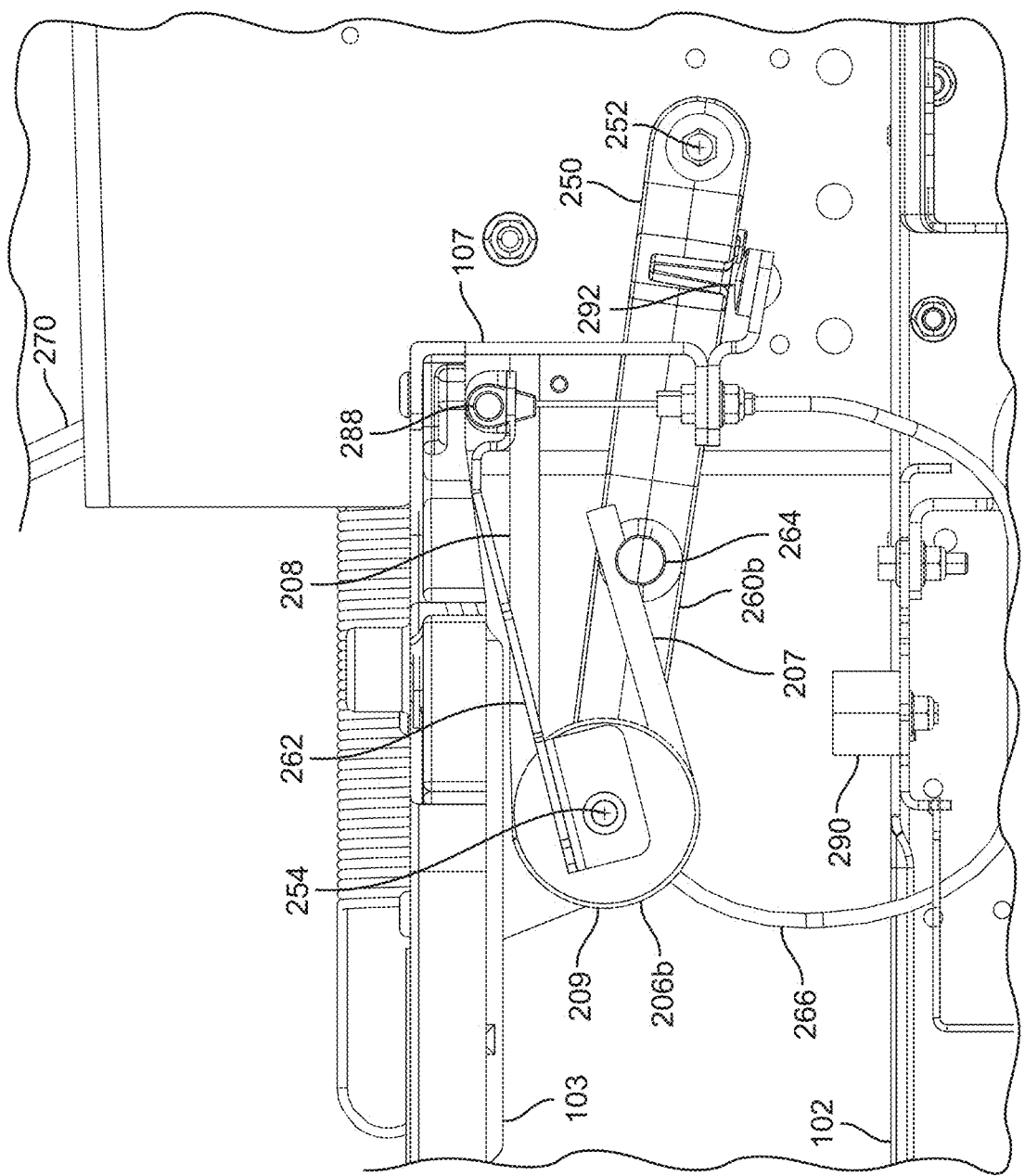
FIG. 7 is a section view taken along line 7-7 of FIG. 5 illustrating the suspension system when the support platform is unloaded and a preload adjustment mechanism of the system is set for a minimal ("least-stiff") preload of the biasing elements.

FIG. 7 illustrates a section view taken along line 7-7 of FIG. 5. As indicated in this view, the coiled body 209 of each torsion spring 206 is secured in place along the pivot axis 254. The leg 208 may then bear directly against (abut) a load surface of either the guide plate 262 as shown (see also isolated perspective view of FIG. 8) or against a shaft 288 (described below) associated with the guide plate, while the leg 207 bears against (abuts) a receiver 264 formed along an inner face of the adjacent arm 260. Thus, the torsion springs 206 may directly act between the shaft 288/guide plate 262 and the pivot member 250, and indirectly between the chassis 102 and the platform 103.

Figure 8:
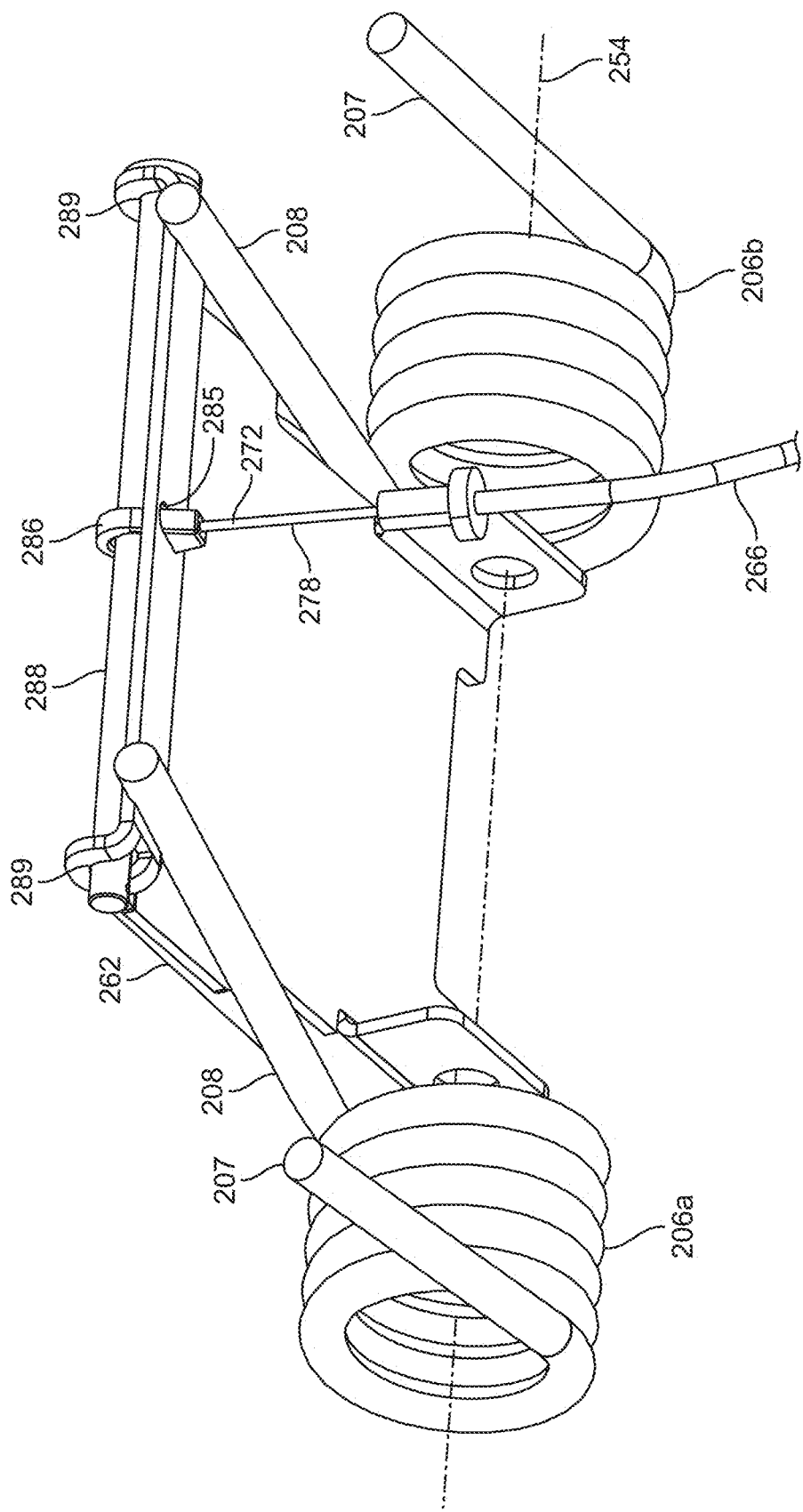
FIG. 8 is a bottom perspective view of portions of an exemplary suspension system in isolation.
Figure 9:
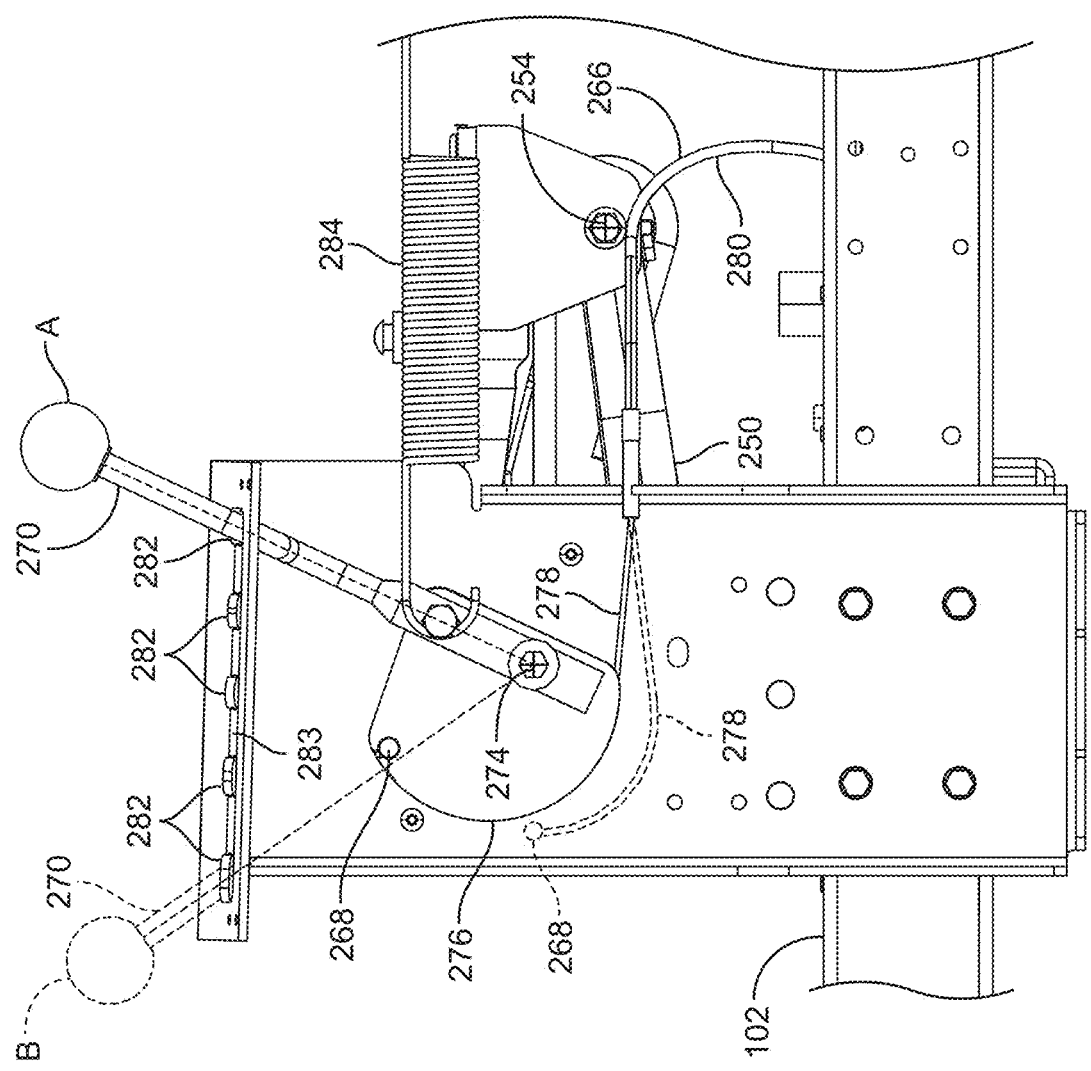
FIG. 9 is a side elevation view of a lever-operated preload adjustment mechanism in accordance with embodiments of the present disclosure, the preload adjustment mechanism adapted to alter the preload of biasing elements of the suspension system.

With reference to FIGS. 8 and 9, the suspension system 200 may further include an adjustment mechanism or "adjuster" that permits a preload on the torsion springs 206 to be altered, thereby changing suspension system characteristics to best satisfy the preferences of a particular operator. In some embodiments, the adjuster may include a Bowden cable 266 having a first end 268 connected to a pulley (also referred to herein as a "cam") of an adjustment lever 270 (see also FIG. 1), and a second end 272 connected to the guide plate 262 or the shaft 288 as further described below. Such an adjuster may permit the action required to alter the preload (e.g., lever movement) to occur remotely from the torsion springs. That is to say, the lever 270 may be located at almost any location on the mower 100, regardless of proximity to the support platform.

The pulley is attached to an adjustment lever 270 that is pivotable, relative to the chassis 102 about an eccentric pivot axis 274, between a plurality of discrete positions. The pulley defines a cam surface 276 along which an inner member 278 of the cable 266 may wrap as the lever/pulley is moved through its range of pivotal motion (full range represented by position "A" (corresponding to highest torsion spring preload) and position "B" (corresponding to lowest preload) in FIG. 9). An outer housing 280 of the cable 266 may then have one end anchored to the chassis 102 as shown in FIG. 9, and its opposite end anchored to a bracket 107 connected to the platform 103 as shown in FIG. 7. As the lever 270 moves from position B toward position A in FIG. 9, the inner member 278 may slide within the outer housing 280, displacing the shaft 288, and thus the guide plate 262, from the position shown in FIG. 7, to the position shown in FIG. 10. As the shaft 288/guide plate 262 is displaced in this direction, the legs 208 of the torsion springs 206 (which are in operative contact with the shaft 288) are displaced, effectively twisting the coiled body 209, which in turn increases the preload simultaneously (and generally equally) on each of the torsion springs. Similarly, the preload on the torsion springs may be simultaneously reduced by moving the lever 270 from position A back toward position B.

To secure the guide plate 262 and shaft 288 at any one of multiple, discrete positions corresponding to positions A, B, and positions of the lever 270 therebetween, the lever may engage one of several discrete notches 282 as shown in FIG. 9. That is, the lever 270 may be moved along a slot 283 and, upon reaching the desired position, moved laterally into engagement with the appropriate notch 282. As shown in FIG. 1, each of the notches may include indicia (e.g., letters or numbers) that indicate a relative preload of the springs (e.g., a relative stiffness of the suspension system). Such indicia may indicate relative stiffness settings (for example, lever position B may be identified as stiffness setting "1," while lever position A may be identified as stiffness setting "5," wherein the intermediate notches 282 may be identified as stiffness settings 2-4).

The profile of the cam surface 276 may be designed so that a relatively consistent actuation force moves the lever 270 through its range of travel. That is to say, the cam surface 276 provides increasing mechanical advantage as lever resistance (i.e., torsion spring preload) increases. To ensure that the change in deflection of the torsion springs 206 is generally equal between any two adjacent notches 282 (thus providing generally linear preload variation between stiffness settings), the angular distance between one pair of adjacent notches may differ from a spacing between another pair of adjacent notches as is evident in FIG. 11. For example, the lever 270 may pivot (about the transverse pivot axis 274 of FIG. 9) through a greater angular travel as it moves between settings 4 and 5 than it does when pivoting between settings 1 and 2.

Figure 11:
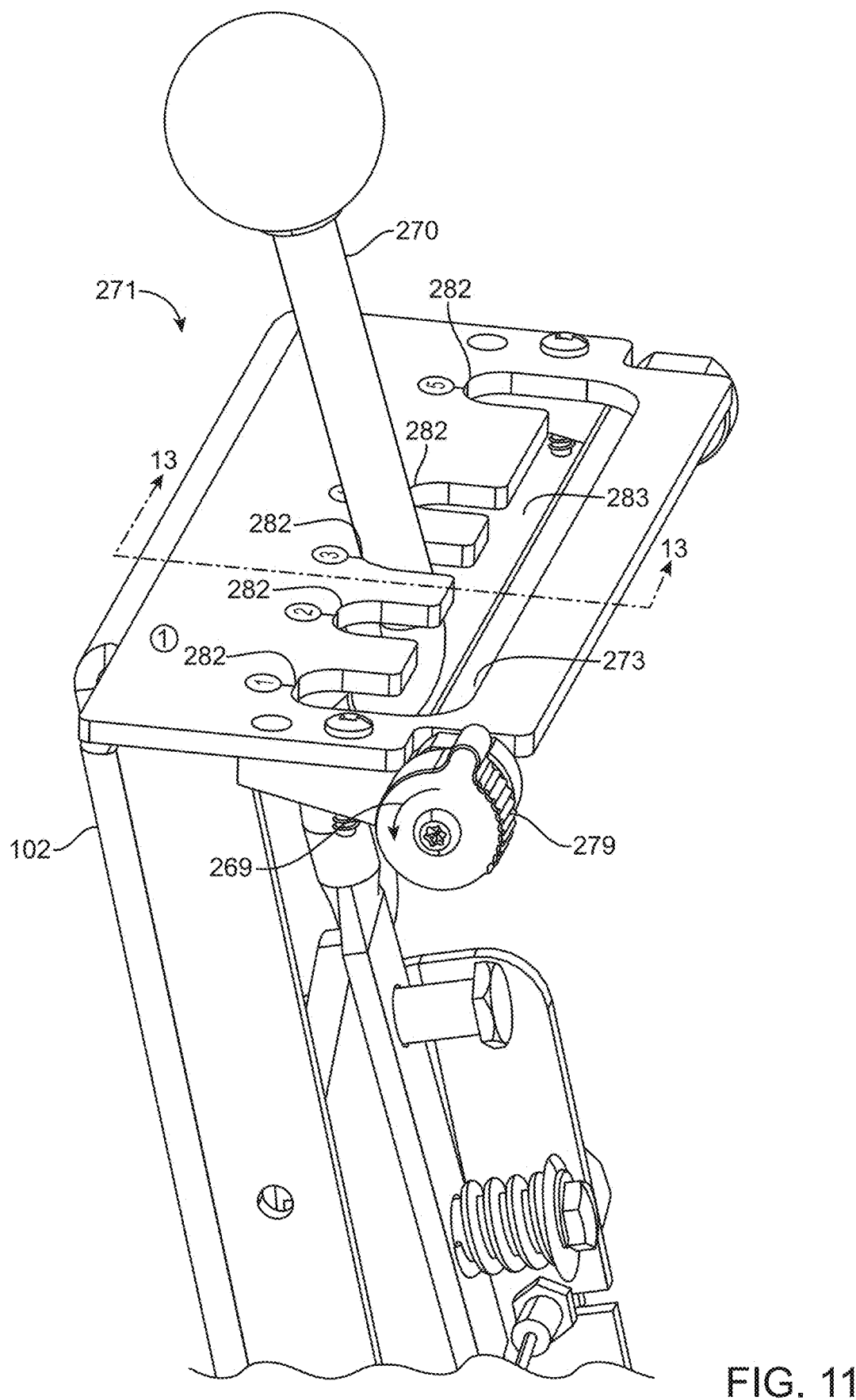
FIG. 11 is a partial perspective view of a preload adjustment mechanism in accordance with another embodiment of the present disclosure, the mechanism including a two-step adjustment procedure.

As shown in FIG. 9, a lever spring 284 (tension spring) may be provided to bias the lever 270 and/or assist with moving the lever toward the higher preload positions. While the particular parameters (length, spring rate, attachment point (moment arm) on pulley, etc.) of the spring 284 may vary, the spring may, in one embodiment, be selected to provide lesser biasing torque to the lever (about the pivot axis 274) as the lever 270 is moved toward positions corresponding to higher torsion spring 206 preloads, and greater biasing force as the lever is moved toward positions corresponding to lower torsion spring preloads. In some embodiments, the spring 284 may be selected to provide a biasing torque on the lever that is approximately equal and opposite to the torque applied by the torsion springs 206 (via the cable 266) when the lever 270 is in an intermediate position (e.g., setting 3 as shown in FIG. 11). As the handle 270 moves from the intermediate position toward a position corresponding to a higher preload on the torsion springs 206 (e.g., toward a preload setting that is higher than the intermediate setting such as setting 5 in FIG. 11), the biasing torque provided by the spring 284 decreases. However, as the handle 270 moves from the intermediate position toward a position corresponding to a lower preload on the torsion springs (e.g., toward a preload setting that is lower than the intermediate setting such as setting 1 in FIG. 11), the biasing torque provided by the spring 284 increases. As a result, the assist spring 284 may, along with the cam surface 276, assist with maintaining a more consistent lever actuation force regardless of the lever's position along the slot 283.

FIG. 8 illustrates attachment of the cable 266, e.g., the inner member 278, to the shaft 288/guide plate 262. In this embodiment, the plate may include an opening 285 through which a cable eye 286 (attached to second end 272 of the inner member 278) may pass. The eye 286 may include an aperture adapted to receive the shaft 288 that is itself engaged with the guide plate by passing through openings 289 formed on the top of the guide plate. The opening 285 allows pivoting of the eye 286 about the shaft 288 as the shaft 288/guide plate 262 moves through its range of motion (see, e.g., FIGS. 7 and 10). As one can appreciate, the guide plate 262 may be used merely to stabilize the shaft 288. That is to say, the adjustment mechanism (i.e., the cable 278) may not even require the guide plate 262. However, use of the guide plate 268 may ensure that the shaft 288 does not shift out of place during operation.

The illustrated construction allows the preload on the torsion springs 206 to be simultaneously (and generally equally) adjusted by manually moving the lever 270 between different notches 282 in the slot 283 of the chassis 102 (see FIG. 9). As the lever moves, the cable 266 causes the shaft 288/guide plate 262 to pivot about the second pivot axis 254, effectively increasing or decreasing the preload on the torsion springs 206. Although not acting directly between the platform 103 and the chassis 102, the torsion springs 206 may resist pivoting of the pivot member 250 about the first pivot axis 252, effectively biasing the platform relative to the chassis.

Figure 10:
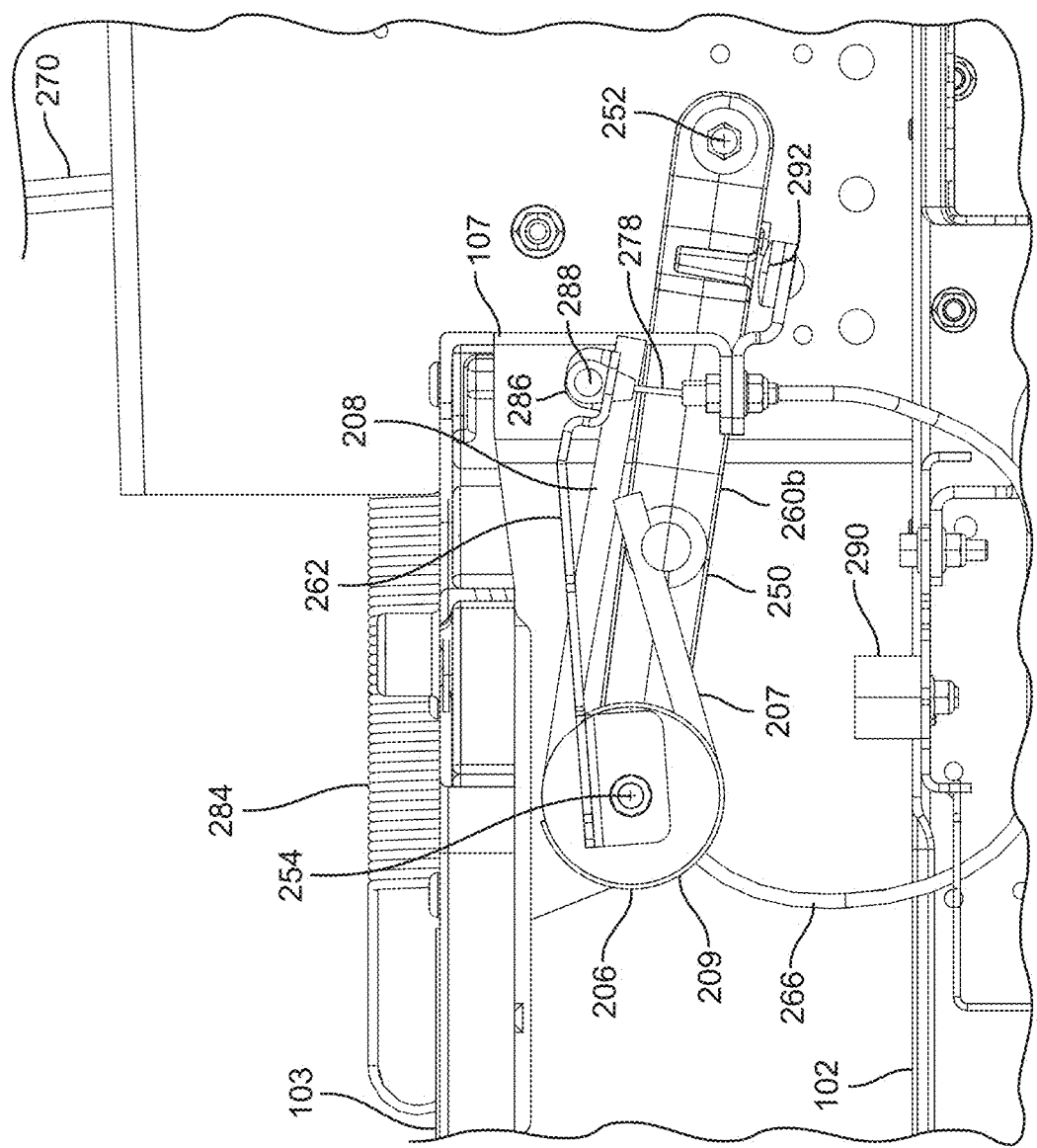
FIG. 10 is a section view similar to FIG. 7 (i.e., the support platform shown unloaded), but with the preload adjustment mechanism set to provide an intermediate preload to the biasing elements.

To limit travel of the support platform 103 relative to the chassis 102, stops 290 and 292 may be provided as shown in FIG. 10. The stop 290 (one located under each arm 260a, 260b) may limit downward movement of the platform 103 by contacting the arms 260 of the pivot member 250, while the stop 292 (attached to the bracket 107) may limit upward movement of the platform upon contact with the pivot member. In the illustrated embodiments, the stops 290, 292 are formed of a resilient, compressible material such as rubber (e.g., neoprene) to effectively reduce hard, jarring impacts at the travel extremes of the platform 103.

FIGS. 11-14 illustrate an adjustment mechanism 271 in accordance with another embodiment of the present disclosure. The adjustment mechanism illustrated in FIGS. 11-14 is similar in many respects to the that described above and thus like reference numerals are used where appropriate. For instance, the adjustment mechanism again includes the lever 270 movable along the slot 283 and, upon reaching the desired position, is movable laterally into engagement with the appropriate notch 282. However, while the adjustment mechanism described previously required only a single step procedure (moving the lever from one notch to another), the adjustment mechanism 271 requires a two-step procedure in order to change the torsion spring preload.

Figure 12:
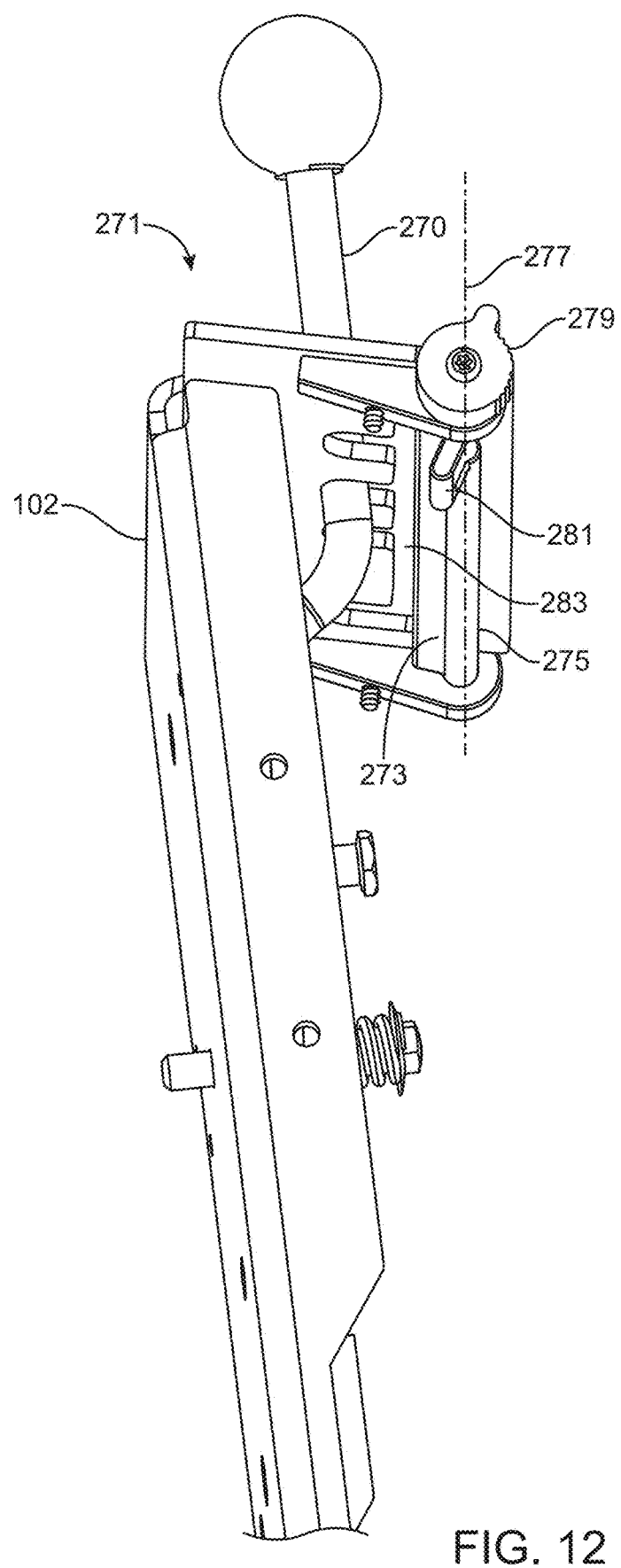
FIG. 12 is bottom perspective view of the preload adjustment mechanism of FIG. 11.

For example, in one embodiment, the adjustment mechanism may include a lever lock 273 as shown in FIGS. 11 and 12. When the lever lock 273 is in a first or closed position (see FIG. 13), the lever lock physically obstructs movement of the lever 270 out of the notches 282 and into the slot 283. That is to say, the lever lock 273 may "lock" the lever 270 in any one of the available notches 282.

Figure 13:
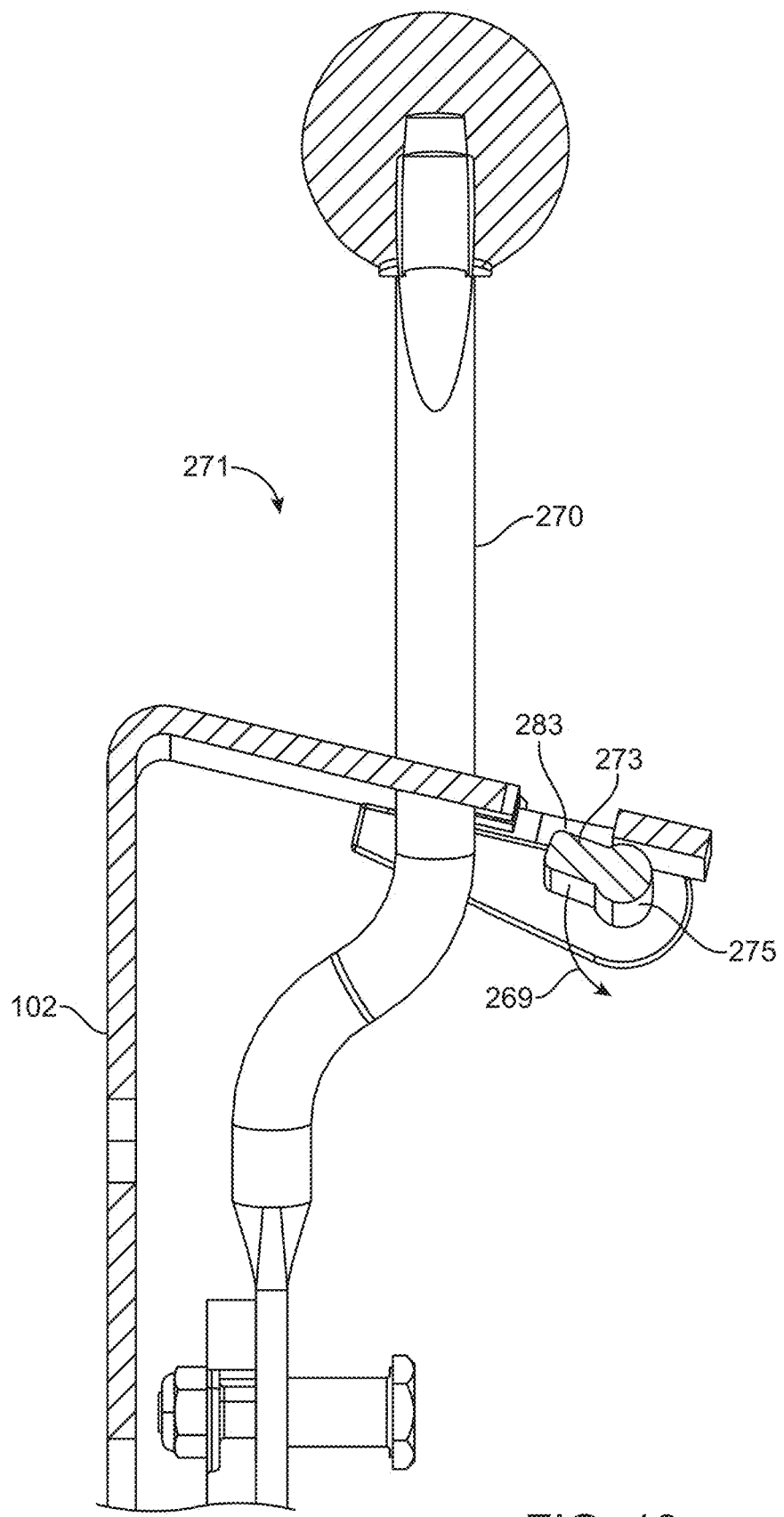
FIG. 13 is section view taken along line 13-13 of FIG. 11 showing a lever lock in a closed position.

While various lever lock configurations are contemplated, an exemplary construction is illustrated in FIGS. 11-13 (lever lock shown in the first or closed position in these figures). As indicated in these views, the lever lock 273 may be configured as a shaft 275 journalled for rotation about an axis 277 that extends generally parallel to the slot 283. The shaft 275 may further define a radially extending protrusion or ear that forms the lever lock 273.

The back end of the shaft 275 may have attached thereto a handle or knob 279 wherein rotation of the knob results in rotation of the shaft and, therefore, pivoting of the lever lock 273. The shaft 275 may further include a leg 281 as shown in FIG. 12 for attachment of a spring or other biasing element (not shown) adapted to bias the lever lock 273 to the first or closed position as shown in FIGS. 11-12.

FIG. 13 is a section view taken along line 13-13 of FIG. 11. As shown in this view, the lever lock 273, which is illustrated in the first or closed position, may again effectively obstruct or block movement of the lever 270 from the notch 282 into the slot 283.

When the operator wishes to adjust the position of the lever 270 (to change a preload on the torsion springs), he or she dismounts the mower (if already seated) and, standing to the side of the mower, rotates the knob 279 in the direction 269 (see FIG. 11) with a first (e.g., left) hand. Such rotation of the knob 279 causes the shaft 275, and thus the lever lock 273, to move from the first or closed position shown in FIG.

Figure 14:
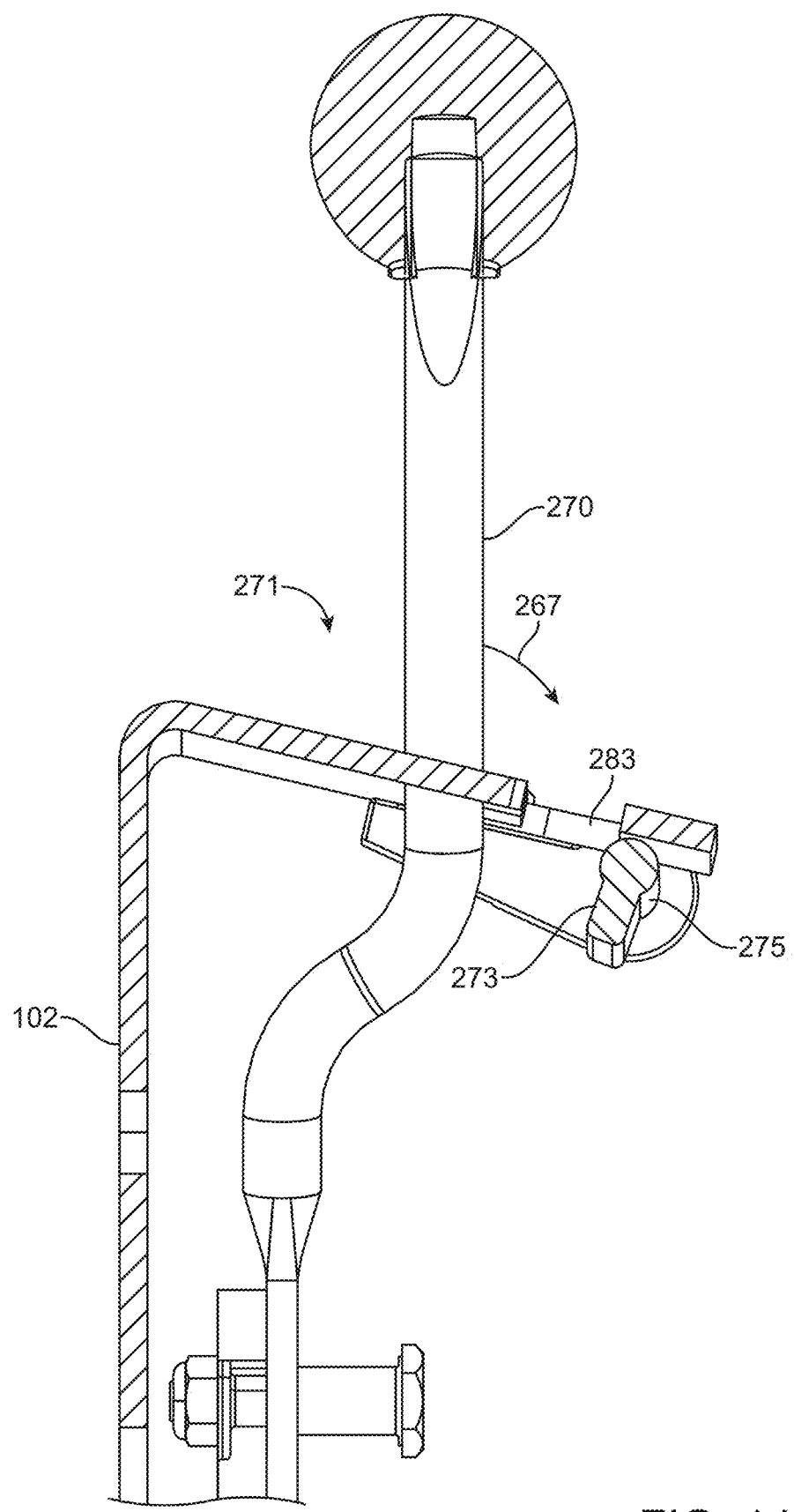
FIG. 14 is a section view similar to FIG. 13, but illustrating the lever lock in an open position.
Figure 15:
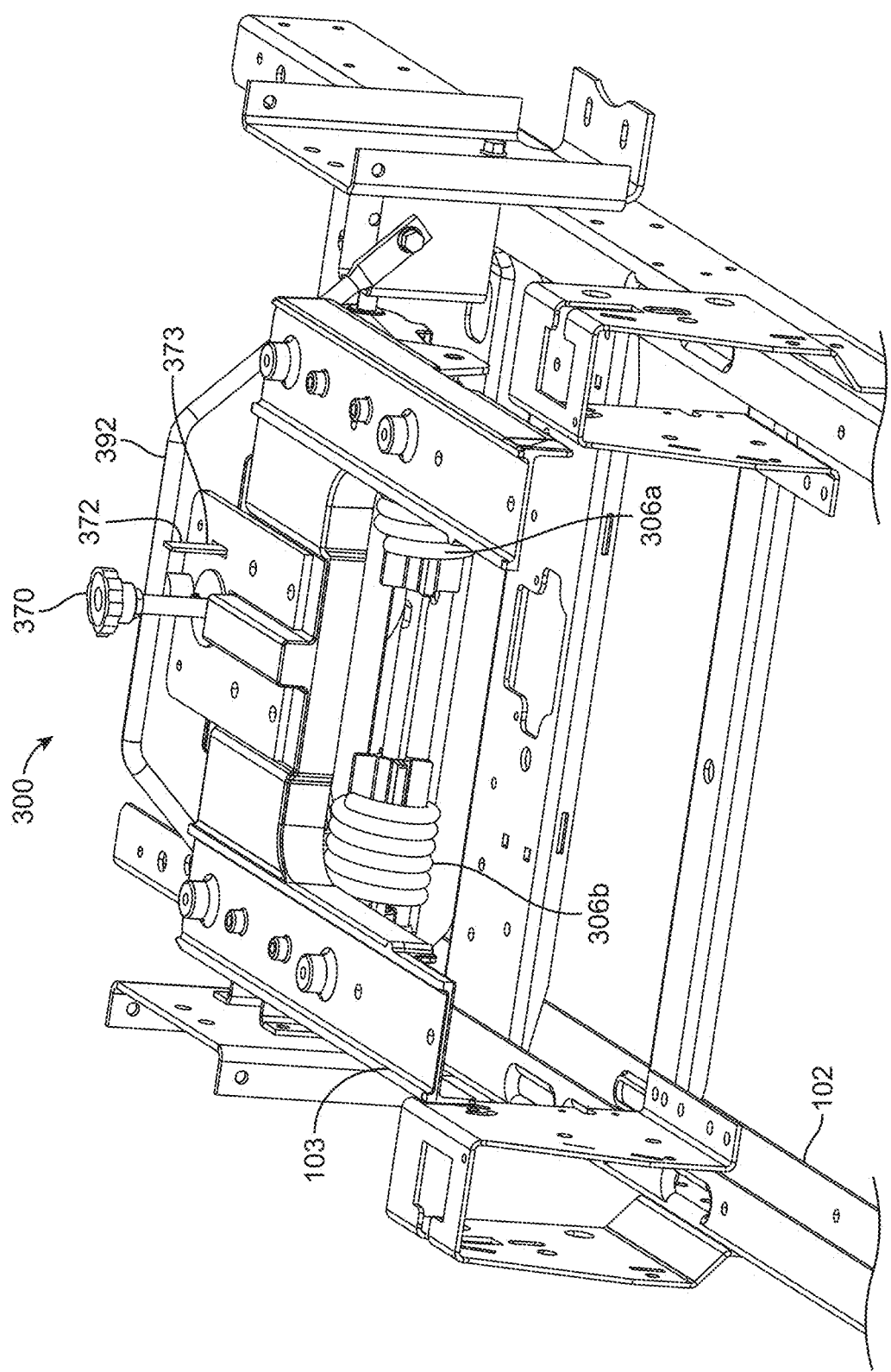
FIG. 15 is a partial perspective view of a suspension system in accordance with another embodiment of the present disclosure, wherein the preload adjustment mechanism includes a threaded screw.

13, to a second or open position shown in FIG. 14. In the open position, the lever 270 is free to move, under a displacing force provided by the operator's other (e.g., right) hand, from the notch 282 into the slot 283 (in the direction 267), at which point the lever is moved until it aligns with another one of the notches. Once the lever 270 is placed into the newly-selected notch 282, the knob 279 is released, allowing the bias applied to the shaft 275/lever lock 273 (in a direction opposite the direction 269 in FIG. 13) to return the lever lock to the closed position (see FIG. 13), thereby locking the lever 270 in the newly-selected notch.

The adjustment mechanism 271 thus requires the operator to execute two discrete steps (while dismounted from the mower) in order to adjust the torsion spring preload. First, the knob 279 is rotated with one hand to move the lever lock 273 out of the closed position (see FIG. 13) and into the open position (see FIG. 14). While holding the knob 279 with one hand to maintain the open position of the lever lock, the operator, using his or her other hand, moves the lever 270 in the direction 267 (see FIG. 14) to relocate the lever to a different notch 282. At this point, the knob 279 is released, thereby locking the lever 270 in this newly-selected notch 282.

Figure 16:
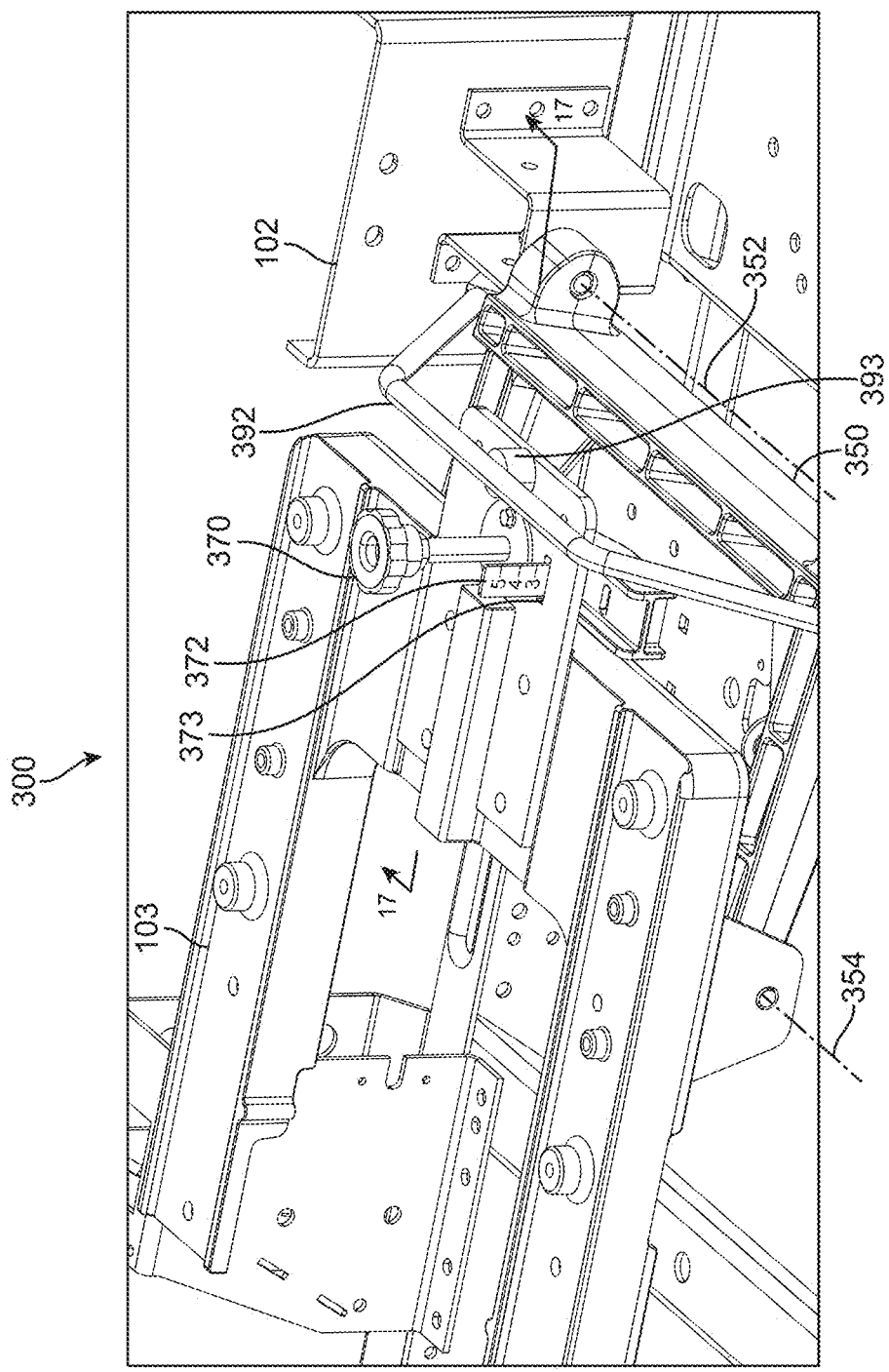
FIG. 16 is another perspective view of the suspension system of FIG. 15.

FIGS. 15-20 illustrate a suspension system 300 in accordance with an alternative embodiment of the present disclosure. As is evident below, the system 300 is similar in many respects to the system 200 described above. For example, the system 300 may again include the second suspension apparatus 204 (not shown) and a first suspension apparatus including two torsion springs 306 positioned beneath the platform 103. However, unlike the system 200, the suspension system 300 may use an adjustment mechanism (adjuster) formed by a rotatable threaded adjuster or screw 370, which may be located under and/or to the rear of the seat (see seat 112 in FIG. 1). FIG. 16 is a view similar to FIG. 15, but taken from a rear perspective.

A preload on the torsion springs 306 may be adjusted via rotation of the screw 370. For example, rotation of the screw 370 in a clockwise direction simultaneously tightens (i.e., increases the preload of) the torsion springs 306, which thereby increases the stiffness of the suspension system. Similarly, rotation of the screw 370 in a counterclockwise direction loosens (i.e., decreases the preload of) the torsion springs, thereby decreasing the stiffness of the suspension system. The system 300 may also include a transverse retention bar 392 to limit an upward position of the platform 103.

In some embodiments, an indicator, e.g., vertical tab 372, is provided. As the screw 370 is rotated, the tab 372 may rise or fall, relative to a slot 373 in the platform, in proportion to the preload applied to the torsion springs 306. The tab 372 may include various indicia (parallel and horizontal letters, numbers, pictures, etc.) that correspond to various preload settings. As a result, the position of the tab 372, with the corresponding indicia, enables the operator to gauge the degree of preload (stiffness) of the suspension system. While shown as a linear translating tab, the indicator could also be configured as a dial gauge, wherein a needle of the gauge would move as the screw 370 is rotated.

Figure 17:
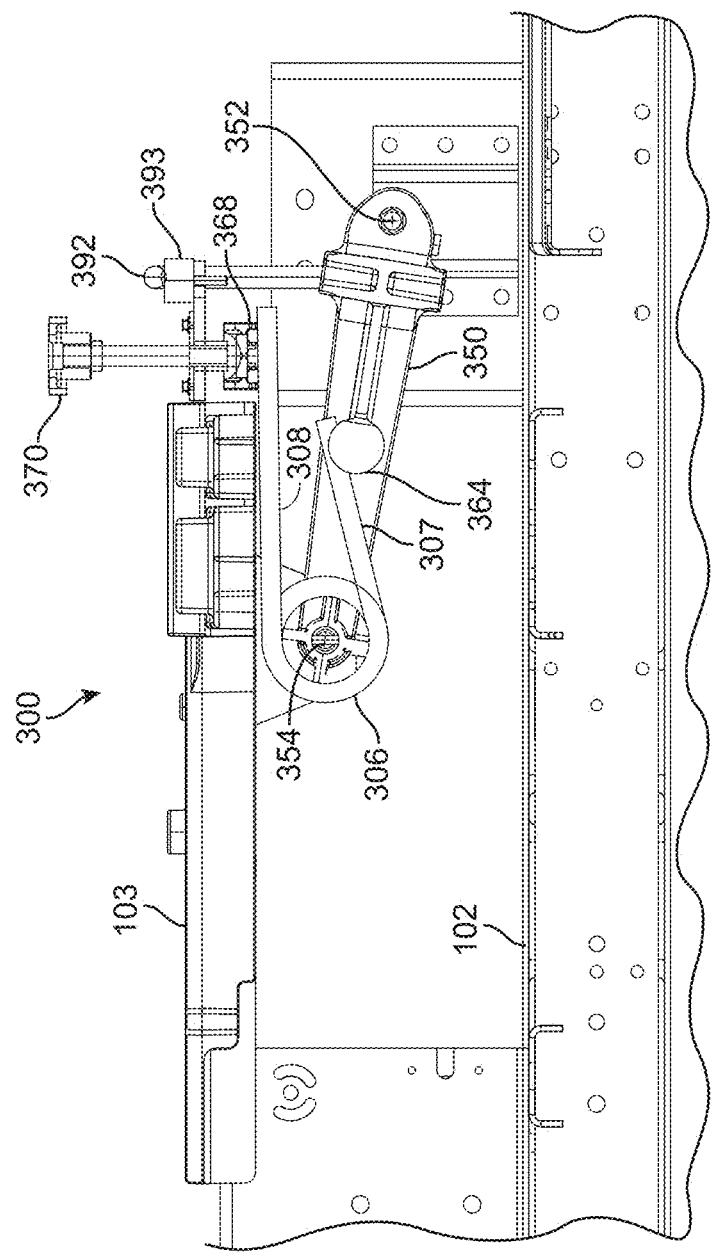
FIG. 17 is a section view taken along line 17-17 of FIG. 16 illustrating the suspension system when the support platform is unloaded and the preload adjustment mechanism is set for a minimal preload of the biasing elements.
Figure 18:
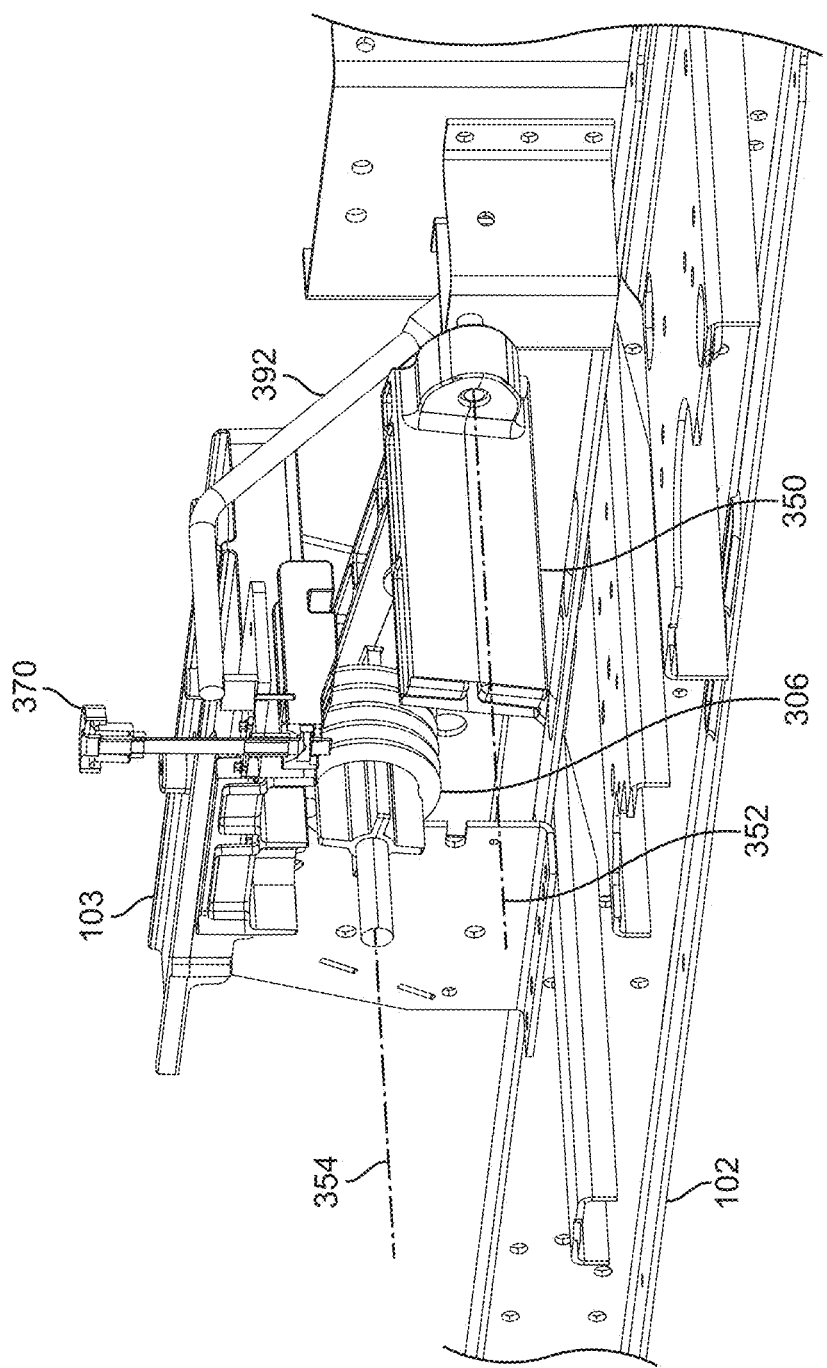
FIG. 18 is a perspective view of the section shown in FIG. 17.

FIG. 17 is a section view of the vehicle suspension system 300 taken along line 17-17 of FIG. 16. In this view, the suspension system is shown: adjusted to the lightest preload (least-stiff) setting; and in an uncompressed or unloaded state. FIG. 18 is a perspective view of this same section from a rear perspective. The transverse retention bar 392 is also visible in these views. The bar 392 may abut an elastomeric pad 393 operatively attached to the platform to effectively limit an upward position of the platform.

As shown in these views, the mower 100 incorporating the suspension system 300 may again include a frame or chassis 102, operator support platform 103, suspensions apparatus 204 (not shown), pivot member 350 (pivotally attached to the chassis 102 at a first transverse pivot axis 352, and to the support platform at a second transverse pivot 354), and torsion springs 306 that are configured as generally described herein in the context of the mower 100/suspension system 200. The torsion springs 306 may be similar or identical to the springs 206 already described herein, e.g., include in inner leg 307 that engages a receiver 364 (protruding stud) on the pivot member 350, while the outer leg 308 engages an adjustment pad 368 that is vertically displaceable by the screw 370.

Figure 19:
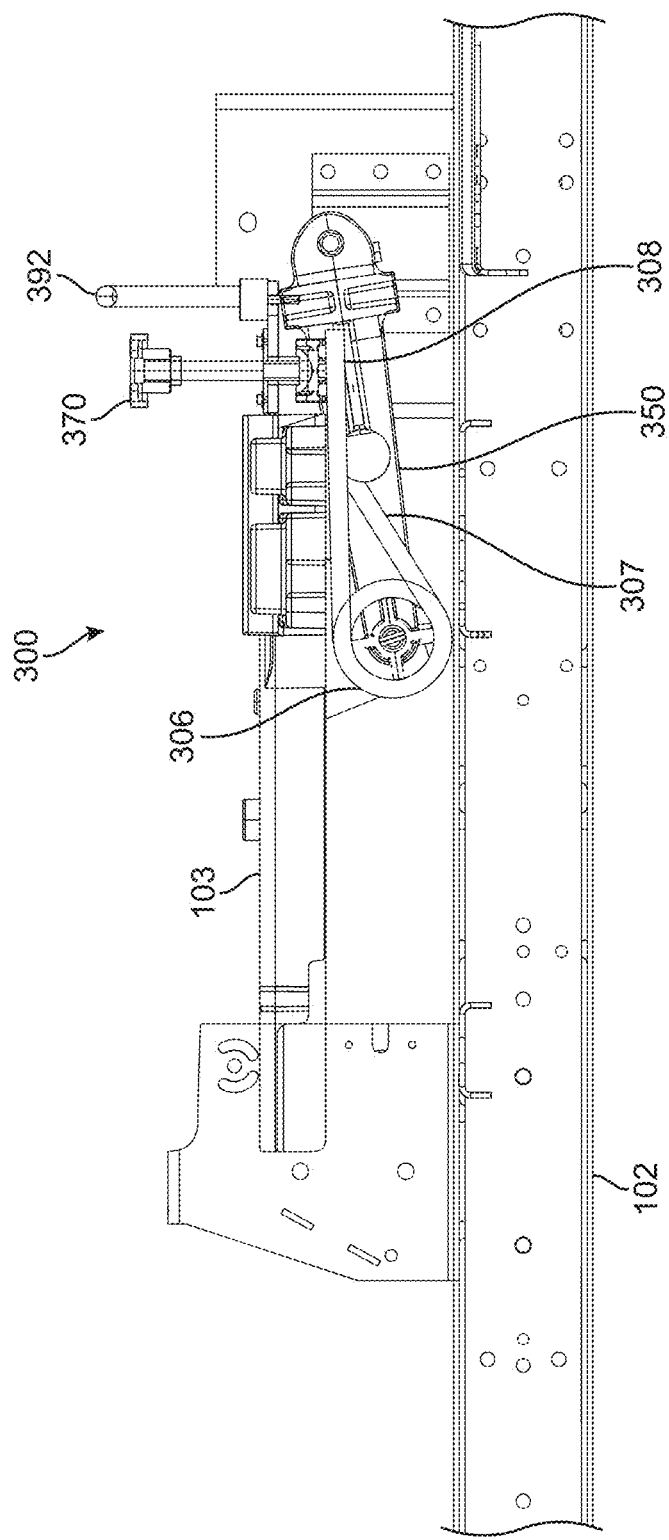
FIG. 19 is a section view similar to FIG. 17, but shown with the support platform loaded.
Figure 20:
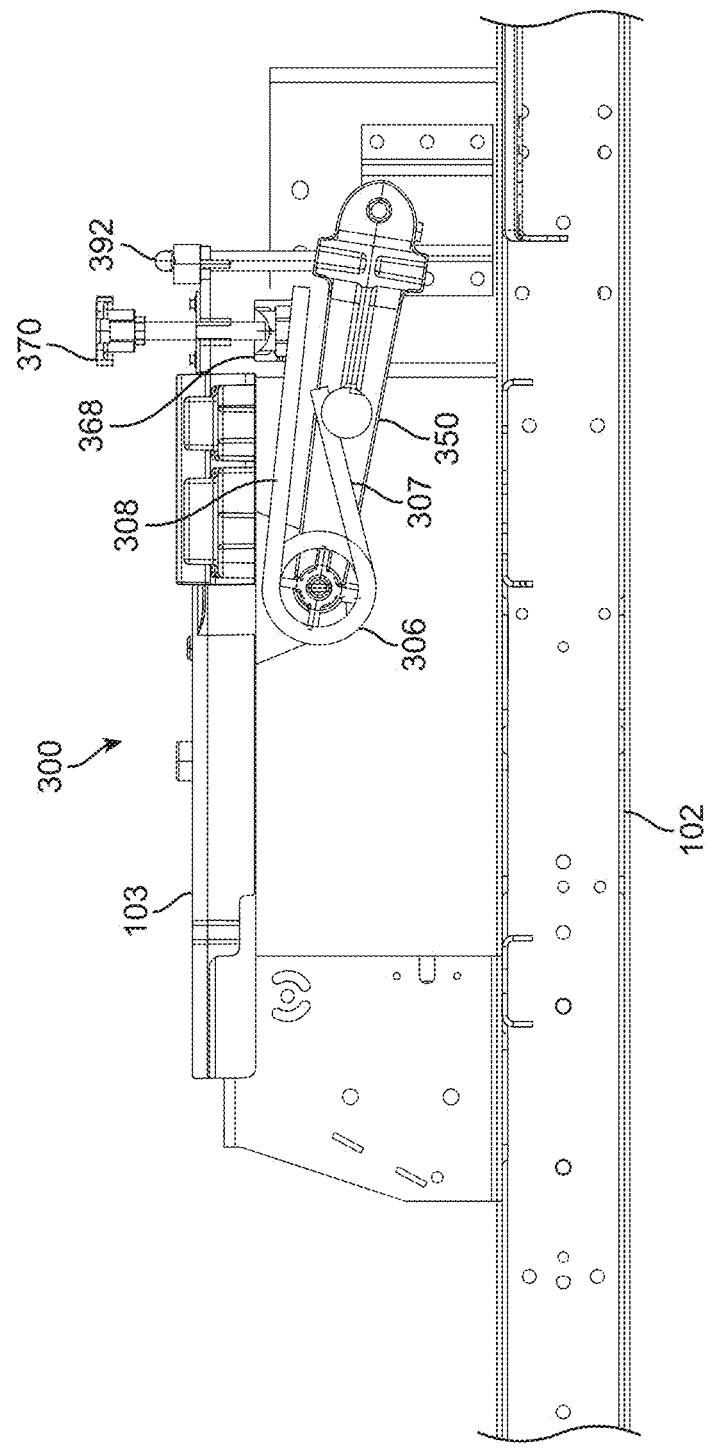
FIG. 20 is a section view similar to FIG. 17 (i.e., the support platform shown unloaded), but with the preload adjustment mechanism set to provide an intermediate preload to the biasing elements.

During operation, the torsion springs 306, like the springs 206, may attenuate operating loads that may otherwise be transmitted to the platform 103. For instance, FIG. 19 is a view similar to FIG. 17, but with the suspension system in a fully compressed or fully loaded state. Similarly, FIG. 20 is a view similar to FIG. 17 (in the unloaded state), but with the adjuster configured to provide the suspension system 300 with a higher preload on the springs 306 (higher suspension system stiffness). That is, the screw 370 has been rotated to displace the pad 368 downwardly to deflect the leg 308 and effectively preload both springs 306.

While illustrated herein as using either a pivoting guide plate/cable or a screw to form the adjuster, other embodiments are contemplated. In fact, most any device operable to apply a preload to the torsion springs (e.g., a lever, direct acting cam, etc.) is possible within the scope of this disclosure.

Figure 21:
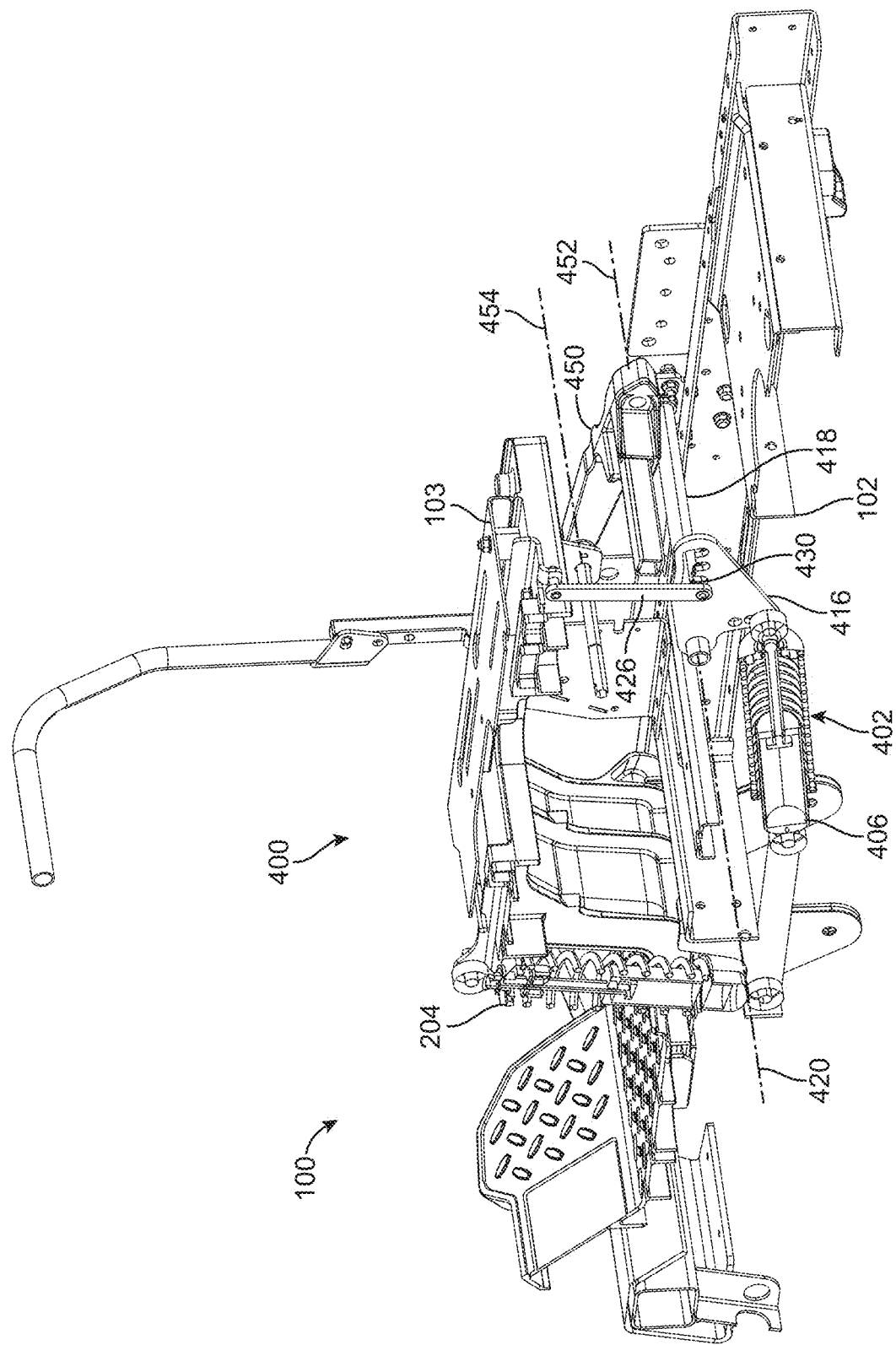
FIG. 21 is a partial, perspective section view of a suspension system in accordance with another embodiment of the present disclosure, wherein the first suspension apparatus is configured as a single coil-over shock absorber.
Figure 22:
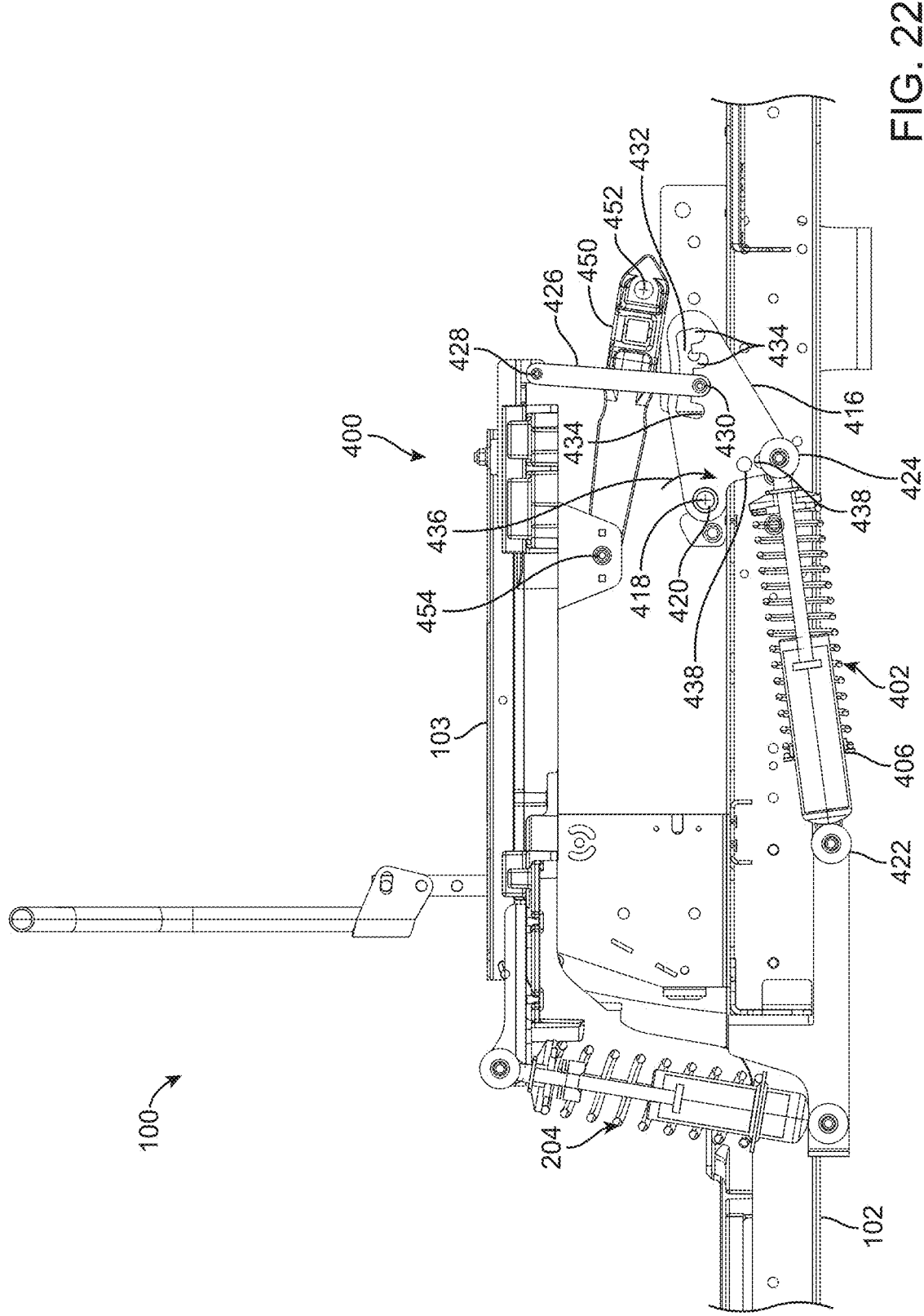
FIG. 22 is a direct section view of the suspension system of FIG. 21.

While shown as utilizing torsion springs to form the first suspension apparatus, other embodiments may utilize other suspension units also contained generally beneath the support platform 103 without departing from the scope of this disclosure. For example, FIGS. 21-22 illustrate a mower 100 (only partially shown) that incorporates a suspension system 400 in accordance with another embodiment of this disclosure. As is indicated below, the system 400 is similar in many respects to the systems 200 and 300 described above. For example, as shown in FIG. 21, the system 400 may again include a frame or chassis 102, operator support platform 103, suspension apparatus 204, and pivot member 450 configured as generally described herein with the same or similarly corresponding reference numerals in the context of the mower 100/suspension system 200. The pivot member 450 may again pivotally attached to the chassis 102 at a first transverse pivot axis 452, and to the support platform at a second transverse pivot 454. However, unlike the suspension systems 200 and 300, the suspension system 300 replaces the torsion springs 206, 306 with a suspension apparatus 402 that includes one or more coil-over shock absorbers 406 positioned in a horizontal or approximately horizontal orientation as shown.

With reference to FIG. 22, the motion of the platform 103 relative to the chassis is again defined by the suspension apparatus 204 (e.g., the pivot member 450). However, the suspension apparatus 400 also includes a bell-crank or pivot plate 416 that is fixed to a pivot shaft 418 such that the pivot plate may pivot, relative to the chassis 102, about a transverse pivot axis 420. The shock absorber 406 may have a first end pivotally coupled to the chassis at a frame pivot 422, and a second end pivotally coupled to the pivot plate at a shock pivot 424. The frame pivot 422 and the shock pivot 424 may both allow pivoting of the shock absorber about associated transverse pivot axes.

The suspension system 400 may further include an arm 426 having a first end pivotally connected to the platform 103 at a platform pivot 428, and a second end defining a stub shaft 430 adapted to pivotally engage the pivot plate 416. In some embodiments, the pivot plate 416 may define a slot 432 with two or more notches 434 in communication therewith.

During operation, the platform 103 may move, relative to the chassis 102, via compliance of the suspension apparatus 204 and movement of the pivot member 450 as already described herein with respect to the suspension systems 200 and 300. As the rear of the platform 103 is displaced downwardly during operation, the arm 426 may transfer downward forces to the pivot plate 416, causing the pivot plate to pivot about the transverse pivot axis 420 defined by the pivot shaft 418 in the direction 436. This pivoting of the pivot plate 416 is resisted by the shock absorber 406, which provides a biasing force to the pivot plate in a direction opposite the direction 436. As a result, downward motion of the platform 103 is influenced (resisted) by the suspension apparatus 204 and the shock absorber 406.

As with the systems 200 and 300 described herein, the suspension system 400 may permit adjustment of the preload on the shock absorber 406 to permit altering suspension system characteristics. For example, in some embodiments, the stub shaft 430 may be moved to a different notch 434. Such movement alters the distance between the pivot axis 418 and the force vector applied by the arm 426, effectively increasing (or decreasing) the moment about the pivot axis resulting from loading of the platform 103. In addition or alternatively to moving the stub shaft 430 to a different notch, the pivot plate 416 may include multiple, e.g., three, apertures 438, each of which is spaced at a different distance from the pivot axis 418. Accordingly, the shock pivot 424 may be located at correspondingly different distances from the pivot axis 418, which may also alter the effective resistance or preload applied by the shock absorber 406. The notches 434 and/or apertures 438 may also include indicia that may assist the operator in adjusting the preload on the shock absorber.

Adjustable positioning of the shock pivot 424 and/or the stub shaft 430 on the pivot plate 416 may allow significant range of resistance provided by the shock absorber 406. As a result, adequate suspension variability may be achieved using only a single shock absorber 406 (in addition to the front shock absorber 204). Such a construction may reduce system cost and complexity for some applications.

Moreover, the shock absorber 406 of the system 400 integrates a dampener (gas strut) therein, which may be beneficial in some instances, e.g., where dampening is desired. However, those of skill in the art will recognize that the torsion spring concepts described herein could also, if desired, incorporate a dampening element (in addition to the dampener provided in front shock absorber 204) to control platform rebound motion without departing from the scope of this disclosure.

Suspension systems described herein thus allow for a compact vehicle suspension system that may be adjusted to provide the desired suspension characteristics. Moreover, exemplary suspension systems may include an adjustment mechanism that allows a preload on one or more biasing elements (e.g., on both torsion springs, or on the shock absorber 406) to be altered. In some embodiments, the first suspension apparatus may include two suspension units (torsion springs 206) and the adjustment mechanism may be adapted to adjust preload on both units simultaneously.

Figure 23:
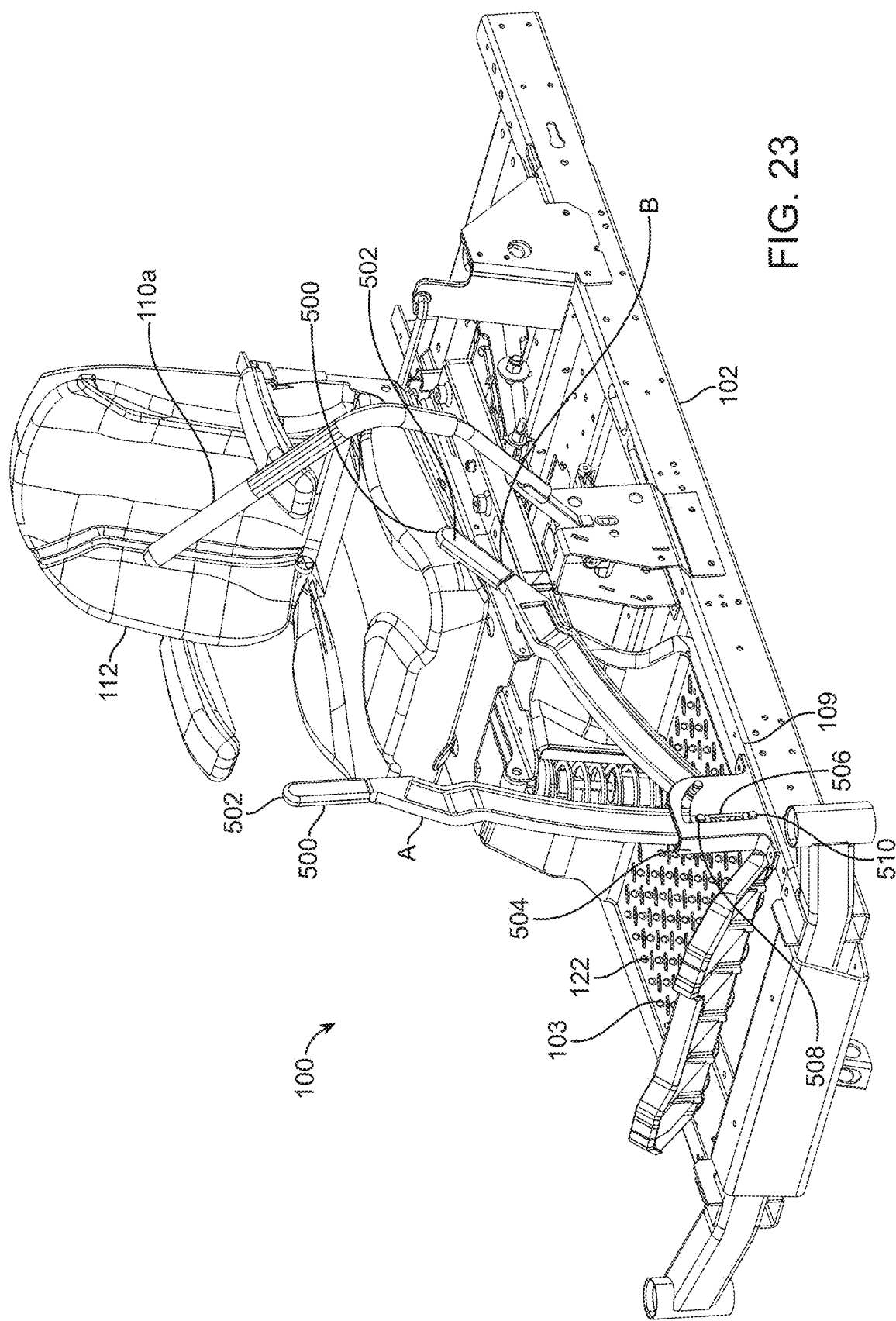
FIG. 23 is a partial perspective view of mount/dismount assist bar in accordance with embodiments of the present disclosure.
Figure 24:
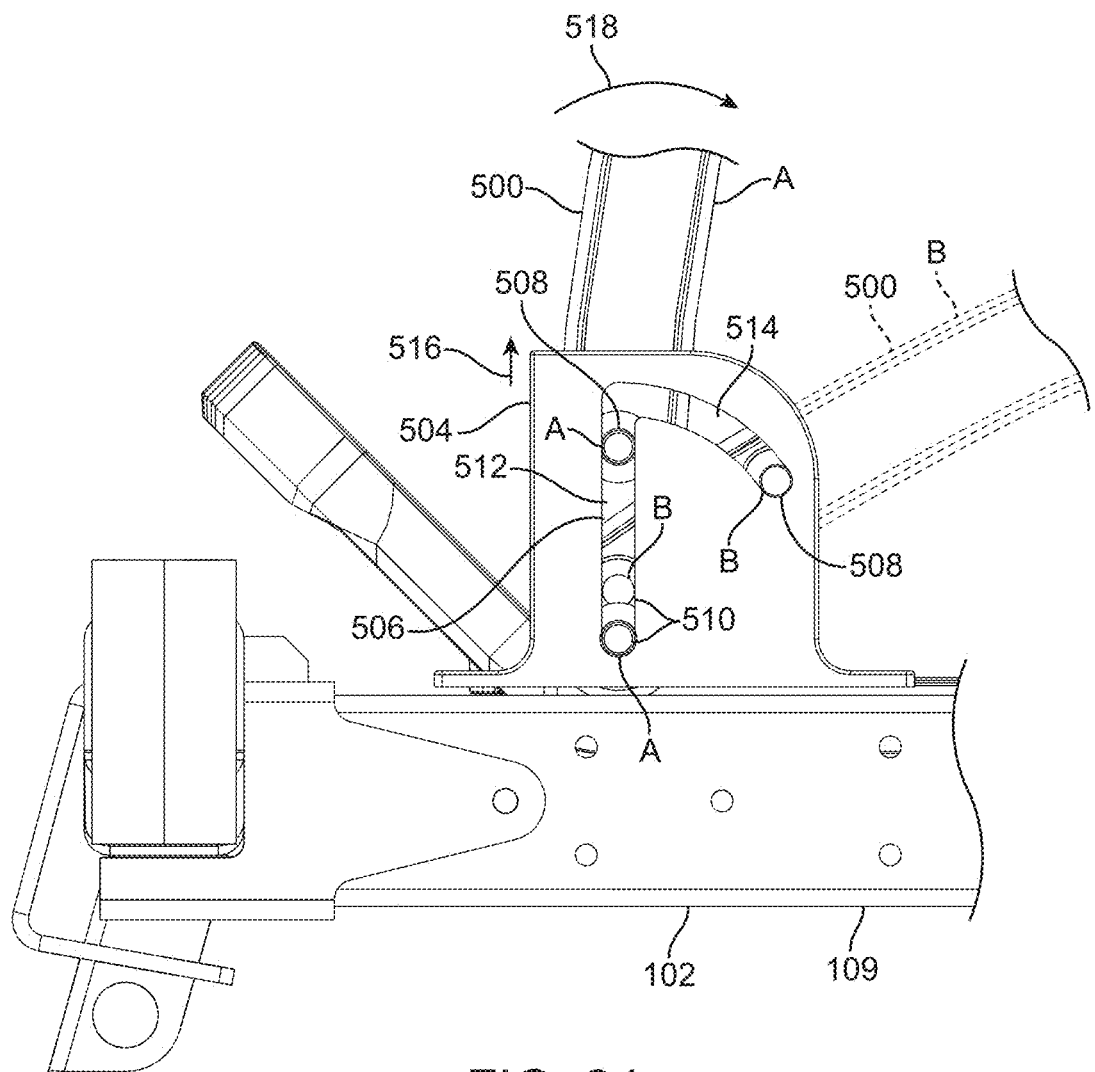
FIG. 24 is a side elevation view of the assist bar of FIG. 23 in both a deployed position (solid lines) and a stowed position (broken lines)

In addition to suspension systems, embodiments of the present disclosure may provide features that assist with mounting and dismounting the operator platform 103 (e.g., the seat 112). For example, FIGS. 23-24 illustrate an assist bar 500 attached, directly or indirectly, to the mower chassis 102 of the mower 100. While not wishing to be bound to any specific configuration, the assist bar 500 may extend upwardly from near a floor pan (e.g., foot support portion 122 of the platform 103). The assist bar 500 may be positioned within easy reach as the operator is rising from the seat 112, or as he/she is otherwise mounting or dismounting the mower. The upper end of the assist bar may include a handle portion 502, which may have a soft, ergonomically-shaped surface that is comfortable to grip.

A lower end of the assist bar may be pivotally connected to the chassis 102 by any suitable means. For instance, in some embodiments, a mount or bracket 504 may be attached to a frame rail 109 of the frame 102 at a location in front of, and to the side of, the operator seat 112. The bracket 504 may include a slot 506 while the assist bar 500 includes pins 508, 510 that may move within the slot(s) to allow pivotal movement of the assist bar between a collapsed or stowed position "B" and a raised or deployed position "A."

The assist bar 500 is shown in both the deployed position A and the collapsed position B in FIG. 23 (such depiction is for illustration purposes only as the bar would be in either position A or position B (or some intermediate position) at any given time). The pivotal connection of the assist bar 500 to the chassis 102, as further described below, may allow the assist bar to selectively lock or otherwise be secured in the deployed position A. With the assist bar in the deployed position, the operator may grasp the handle portion 502 during mounting/dismounting of the mower. That is to say, the assist bar 500 may provide an additional support to assist the operator as he/she mounts and dismounts the mower.

As stated above, the assist bar 500 may be designed to pivot to the stowed position B as shown in FIG. 23. In the stowed position, the assist bar is generally positioned to minimize interference with machine steering controls and operator line-of-sight. Moreover, stowing the assist bar 500 may reduce inadvertent contact of the assist bar with surrounding bushes, trees, or other obstacles during use of the mower. In one embodiment, the assist handle 502 is located at or near the seat 112 when in the stowed position to allow convenient access during movement of the assist bar toward or away from the stowed position B.

As shown in FIG. 24, pivotal attachment of the assist bar may be accommodated by the bracket 504. The bracket includes the slot 506 having a vertical portion 512 rising to intersect with an arc-shaped portion 514. As stated above, the assist bar 500 may include the two pins 508 and 510 that move within the slot 506. Specifically, when the assist bar 500 is in the deployed position A as shown in solid lines in FIG. 24, the two pins 508, 510 are captured within the vertical portion 512 of the slot 506 such that the assist bar is held in place (against all but vertical displacement). When the operator wishes to move the assist bar 500 to the stowed position B shown in broken lines in FIG. 24, the assist bar 500 may be displaced upwardly (e.g., in the direction 516) until the upper pin 508 exits the vertical portion 512 of the slot 506 and enters the arc-shaped portion 514. At this point, the bar 500 may be pivoted about the lower pin 510 in the direction 518 as the upper pin 508 moves along the arc-shaped portion until the assist bar reaches the stowed position B. Accordingly, the positions of the pins 508 and 510 may be located in the positions indicated as "A" when the assist bar 500 is in the deployed position A, and in the positions indicated as "B" when the assist bar is in the stowed position B.

In another embodiment, the assist bar extends above the foot plate in a substantially vertical orientation, and its upper end again includes a handle portion. However, instead of moving to a stowed position via pivotal movement, this alternative assist bar may have a telescoping construction to collapse its height when not in use. Such a telescoping assist bar is described in more detail in U.S. Pat. No. 8,794,660.

Figure 25:
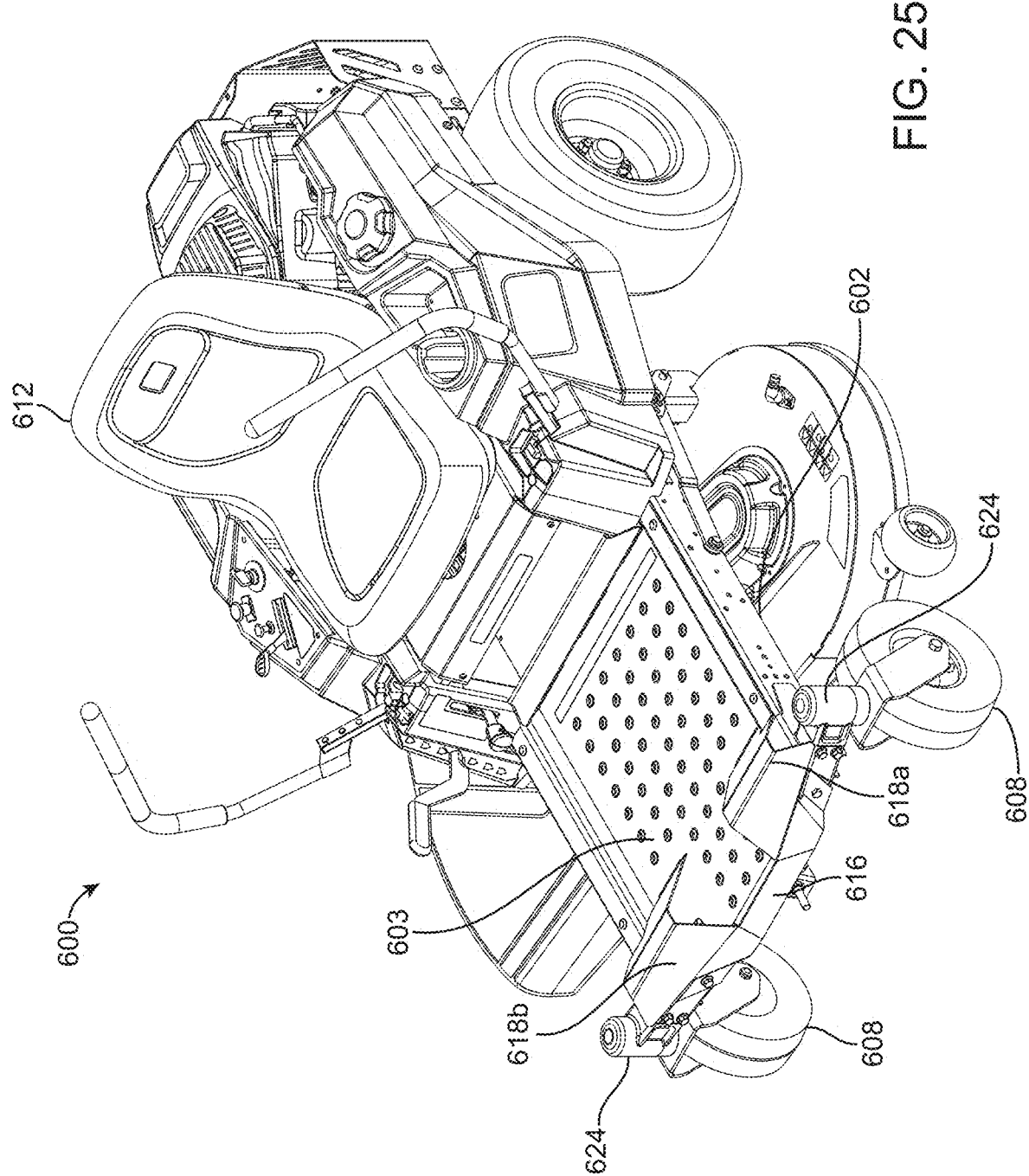
FIG. 25 is a perspective view of a grounds maintenance vehicle (e.g., riding lawn mower) in accordance with another embodiment of the present disclosure, the mower shown incorporating low, step-through front access.
Figure 26:
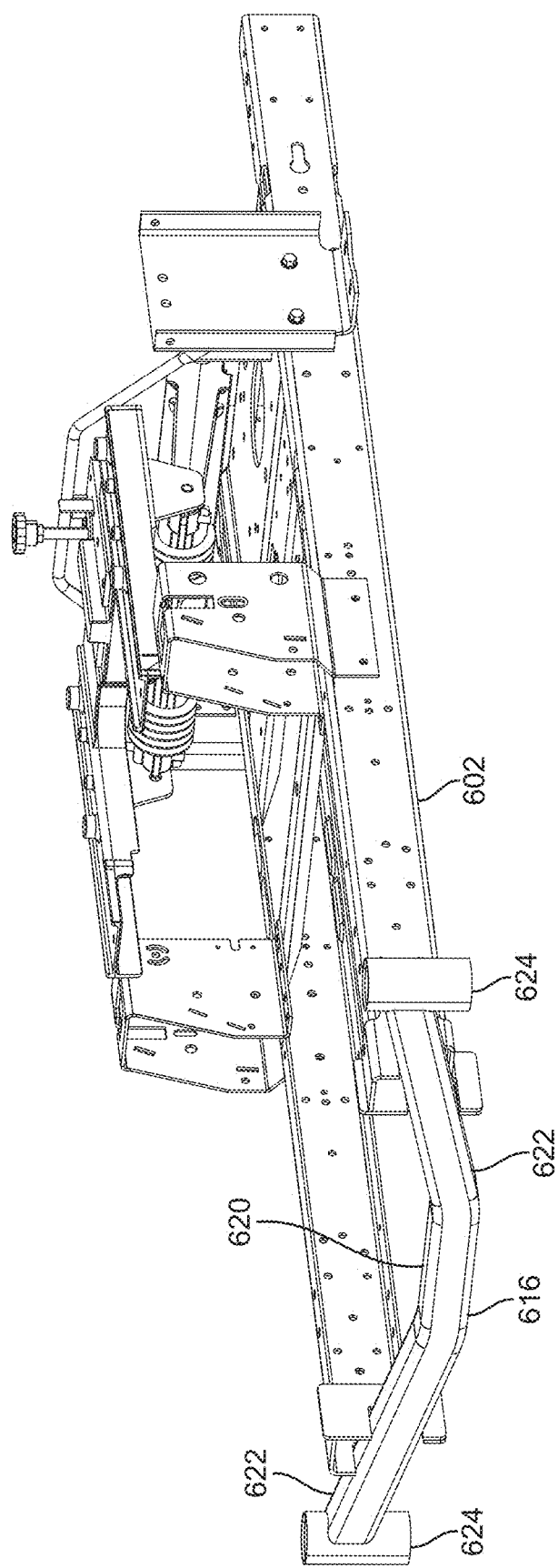
FIG. 26 is a partial, isolated view of a chassis of the mower of FIG. 25.

In other embodiments, other features may be provided to assist the operator with mounting and dismounting the mower. For example, FIGS. 25-26 illustrate a ZTR mower 600 having a fixed foot support portion or floor pan 603 as opposed to the floating platform 103 described elsewhere herein.

The ZTR mower 600 includes a pair of caster wheels 608 at the front of the mower. In conventional ZTRs, the two front caster wheels are interconnected by a straight axle or "beam." In order to accommodate the caster wheel diameter and the caster mechanism, this beam may be located at an elevation that creates a step-up height higher than what some operators may prefer when stepping onto, or off of, the mower. Moreover, in conventional ZTRs, an angled foot rest is commonly included and generally extends across the transverse width of the front of the mower. As a result, when mounting/dismounting such mowers from the front, the operator may be required to step not only to the height defined by the beam, but also sufficiently high to traverse the foot rest.

Mowers in accordance with embodiments of the present disclosure, however, may utilize a beam 616 that is, at least near a centerline of the mower 600, at a lower elevation (e.g., at an elevation that is about 1.5-2 inches lower) than its elevation near the caster wheel mounts 624. In fact, as shown in FIG. 25, the beam 616 may be at the same elevation, e.g., flush with, the floor pan 603.

Moreover, the mower 600 may further include a step-through foot rest 618, which allows the operator to step on and off the machine easily via the mower's front end without obstruction from the foot rest. This feature, in combination with the front beam 616 being generally flush in elevation with the floor pan, provides a single, unobstructed step that is positioned more closely to the ground than may otherwise be possible with a conventional beam and footrest configuration.

To provide this step-through path, the front of the mower uses two spaced-apart transverse foot rest members 618a, 618b (as opposed to a single continuous foot rest) secured to the front portion of the floor pan 603. Each foot rest member is generally V- or U-shaped and presents an angled surface upon which the operator may rest his or her feet when sitting in the seat 612. Each of the foot rest members 618a, 618b extends in a transverse direction near the front of the floor pan 603. The step-through feature is then formed between the spaced-apart foot rest members 618.

The step-through area may be configured to provide surfaces that minimize slipping and falls. Specifically, the surfaces of the foot rest members and step-through areas may have either an adhesive-backed textured decal, or may be stamped or embossed. Such surfaces may increase the operator's traction when mounting or dismounting the mower.

FIG. 26 depicts the chassis 602 with various structure removed to illustrate the shape of the transverse beam 616. As shown in this view, the transverse beam 616 may include a flat center portion 620 near its center, and upwardly and outwardly extending portions 622 extending from the flat center portion transversely to the caster wheel mounts 624. Stated another way, the beam 616 may appear as a flattened "V" shape when viewed from the front of the mower.

Operator mount/dismount access features (e.g., assist bar, step-through front) as described herein may find application to mowers with or without suspension systems. In fact, such features may be utilized with other non-mowing vehicles without departing from the scope of this disclosure.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising:
   a chassis comprising a front end, a rear end, and a longitudinal axis extending between the front and rear ends;
   a support platform extending along the longitudinal axis, the support platform comprising a seat support portion; and
   a suspension system comprising:
      a first suspension apparatus operatively acting between the chassis and the seat support portion of the support platform, wherein the first suspension apparatus comprises first and second torsion springs, and wherein the torsion springs are adapted to elastically deflect when the support platform is displaced relative to the chassis;
      a second suspension apparatus longitudinally spaced-apart from the torsion springs, the second suspension apparatus operatively connected to both the support platform and the chassis; and
      an adjuster adapted to simultaneously adjust a preload applied to both of the first and second torsion springs.

2. The vehicle of claim 1, wherein the suspension system comprises a pivot member pivotally coupled to the chassis and to the support platform.

3. The vehicle of claim 2, wherein the first and second torsion spring act upon the pivot member.

4. The vehicle of claim 1, wherein the first and second torsion springs are spaced-apart from one another in a direction transverse to the longitudinal axis.

5. The vehicle of claim 1, wherein the adjuster comprises either a pivoting lever or a screw.

6. The vehicle of claim 1, wherein the second suspension apparatus comprises a coil-over shock absorber.

7. A grounds maintenance vehicle comprising:
   a chassis comprising a front end, a rear end, and a longitudinal axis extending between the front and rear ends;
   a support platform extending along the longitudinal axis, the support platform comprising: a seat support portion; a foot support portion; and a connecting structure connecting the seat support portion to the foot support portion; and a suspension system comprising:
    a first suspension apparatus adapted to bias the support platform away from the chassis, wherein the first suspension apparatus comprises first and second torsion springs spaced-apart from one another in a direction transverse to the longitudinal axis, the torsion springs adapted to elastically deflect when the support platform is displaced toward the chassis;
    a second suspension apparatus longitudinally spaced-apart from the first suspension apparatus, wherein the second suspension apparatus is also adapted to bias the support platform away from the chassis; and
    an adjuster adapted to simultaneously alter a preload applied to both of the first and second torsion springs.

8. The vehicle of claim 7, further comprising a pivot member defining a transverse first pivot axis and a transverse second pivot axis, wherein the pivot member is: pivotally coupled to the chassis at the first pivot axis; and pivotally coupled to the support platform at the second pivot axis.

9. The vehicle of claim 8, wherein the first and second torsion springs are both positioned about the second pivot axis.

10. The vehicle of claim 8, wherein the first and second torsion springs act upon the pivot member.

11. The vehicle of claim 7, wherein the adjuster comprises a lever pivotable between a plurality of discrete positions relative to the chassis, wherein each of the plurality of discrete positions corresponds to a different preload applied to both the first and second torsion springs.

12. The vehicle of claim 11, wherein the lever comprises a pulley pivotable about an eccentric pivot axis, and wherein a cable extends between the pulley and a shaft, the shaft in operative contact with a leg of each of the first and second torsion springs.

13. The vehicle of claim 11, wherein the plurality of discrete positions are defined by notches arranged along a slot, and wherein a spacing between a first pair of adjacent notches differs from a spacing between a second pair of adjacent notches.

14. The vehicle of claim 11, further comprising a lever spring adapted to provide a lever biasing torque to the lever, wherein the lever biasing torque decreases as the lever moves from an intermediate position to a position corresponding to a higher preload on the first and second torsion springs, and increases as the lever moves from the intermediate position to a position corresponding to a lower preload on the first and second torsion springs.

15. The vehicle of claim 7, wherein the adjuster comprises a threaded adjuster adapted to vary the preload applied to both the first and second torsion springs.

16. A riding lawn mower comprising:
    a chassis comprising a front end, a rear end, and a longitudinal axis extending between the front and rear ends;
    a support platform extending along the longitudinal axis, the support platform comprising: a seat support portion supporting an operator seat; a foot support portion; and
    a connecting structure connecting the seat support portion to the foot support portion;
    a pivot member defining a transverse first pivot axis and a transverse second pivot axis, wherein the pivot member is: pivotally coupled to the chassis at the first pivot axis; and pivotally coupled to the support platform at the second pivot axis; and
    a suspension system comprising:
        first and second torsion springs positioned about the second pivot axis, the torsion springs operatively biasing the support platform upwardly and away from the chassis, wherein the torsion springs elastically deflect when the support platform is displaced toward the chassis, the torsion springs located longitudinally near the seat support portion;
        a coil-over shock absorber positioned longitudinally forward from the first and second torsion springs, wherein the shock absorber is operatively connected to the platform and to the chassis; and
        an adjuster adapted to simultaneously alter a preload applied to both of the first and second torsion springs.

17. The mower of claim 16, wherein the adjuster comprises a shaft in operative contact with a first leg of each of the first and second torsion springs.

18. The mower of claim 17, wherein a second leg of each of the first and second torsion springs is in abutting contact with the pivot member.

19. The mower of claim 16, wherein the adjuster comprises a lever pivotable between a plurality of discrete positions relative to the chassis, wherein each of the plurality of discrete positions corresponds to a different preload applied to both of the first and second torsion springs.

20. The mower of claim 19, wherein the lever comprises a pulley pivotable about an eccentric pivot axis, and wherein a cable extends between the pulley and a shaft, the shaft in operative contact with a leg of each of the first and second torsion springs.

21. The mower of claim 19, wherein the plurality of discrete positions are defined by notches arranged along a slot, and wherein a spacing between a first pair of adjacent notches differs from a spacing between a second pair of adjacent notches.

22. The mower of claim 19, further comprising a lever spring adapted to provide a lever biasing torque to the lever, wherein the lever biasing torque decreases as the lever moves from an intermediate position to a position corresponding to a higher preload on the first and second torsion springs, and increases as the lever moves from the intermediate position to a position corresponding to a lower preload on the first and second torsion springs.

23. The mower of claim 16, wherein the adjuster comprises a threaded adjuster adapted to vary the preload applied to both of the first and second torsion springs.

24. The mower of claim 16, wherein the first pivot axis is longitudinally aft of the second pivot axis.

25. The mower of claim 16, wherein the second pivot axis is located near the seat support portion.

* * * * *